(12) United States Patent
Maru et al.

(10) Patent No.: US 11,529,958 B2
(45) Date of Patent: Dec. 20, 2022

(54) CALCULATION APPARATUS AND ARITHMETIC METHOD

(71) Applicant: Faurecia Clarion Electronics Co., Ltd., Saitama (JP)

(72) Inventors: Mitsunori Maru, Tokyo (JP); Shinichi Amaya, Saitama (JP); Isamu Oda, Saitama (JP); Takefumi Kudo, Saitama (JP); Takaaki Shiina, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 17/251,772

(22) PCT Filed: Mar. 18, 2019

(86) PCT No.: PCT/JP2019/011179
§ 371 (c)(1),
(2) Date: Dec. 11, 2020

(87) PCT Pub. No.: WO2019/239665
PCT Pub. Date: Dec. 19, 2019

(65) Prior Publication Data
US 2021/0163011 A1    Jun. 3, 2021

(30) Foreign Application Priority Data
Jun. 15, 2018 (JP) .............................. JP2018-114809

(51) Int. Cl.
*B60W 30/18* (2012.01)
*B60W 60/00* (2020.01)
(Continued)

(52) U.S. Cl.
CPC ... *B60W 30/18163* (2013.01); *G01C 21/3691* (2013.01); *G08G 1/167* (2013.01);
(Continued)

(58) Field of Classification Search
CPC ... B60W 30/18163; B60W 2554/4042; B60W 2554/802; B60W 2554/804;
(Continued)

(56) References Cited

U.S. PATENT DOCUMENTS

2018/0057002 A1* 3/2018 Lee .................. B60W 60/00276
2018/0345978 A1* 12/2018 Fujii .................... B62D 15/0255
2021/0016779 A1* 1/2021 Gillet .................. B60W 50/085

FOREIGN PATENT DOCUMENTS

JP    2007-17396 A    1/2007
JP    2016-017914 A   2/2016
(Continued)

OTHER PUBLICATIONS

International Search Report with English translation and Written Opinion of corresponding PCT/JP2019/011179, dated Jun. 18, 2019.
(Continued)

*Primary Examiner* — Abby Y Lin
*Assistant Examiner* — Hossam M Abd El Latif
(74) *Attorney, Agent, or Firm* — Volpe Koenig

(57) ABSTRACT

A calculation apparatus includes a control unit configured to calculate a necessary distance that is necessary for a vehicle to perform lane change from a first travel lane to a second travel lane by combining a first distance that the vehicle travels while the vehicle waits to start the lane change, a second distance that the vehicle travels while a speed of the vehicle is adjusted, and a third distance that the vehicle travels while executing the lane change.

11 Claims, 17 Drawing Sheets

(51) Int. Cl.
  *G01C 21/34* (2006.01)
  *G01C 21/36* (2006.01)
  *G08G 1/0968* (2006.01)
  *G08G 1/16* (2006.01)

(52) U.S. Cl.
  CPC ............... *B60W 2554/4042* (2020.02); *B60W 2554/802* (2020.02); *B60W 2554/804* (2020.02)

(58) Field of Classification Search
  CPC ....... B60W 2520/10; B60W 2554/406; B60W 60/0011; G01C 1/3691; G01C 21/3407; G08G 1/167; G08G 1/096811; G08G 1/096827
  USPC .......................................................... 701/41
  See application file for complete search history.

(56) References Cited

FOREIGN PATENT DOCUMENTS

| JP | 2016-18495 A | | 2/2016 |
| JP | 2016017914 A | * | 2/2016 |
| JP | 2016018495 A | * | 2/2016 |

OTHER PUBLICATIONS

Extended European Search Report dated Jan. 26, 2022 for corresponding European Application No. 19819487.0 (7 pages).
Japanese Office Action dated Jun. 21, 2022 for Japanese Patent Application No. 2018-114809.
Japanese Office Action dated Oct. 18, 2022 for Japanese Patent Application No. 2018-114809.

* cited by examiner

FIG. 2

```
                            ┌─────────────────────────────────────────┐
                       244  │              SEARCH TABLE               │
                            ├─────────────────────────────────────────┤
          2441 ── ORIGIN COORDINATES
          2442 ── DESTINATION COORDINATES
          2443 ── LINK PROPERTY INFORMATION
          2444 ── NODE NUMBER
          2445 ── NODE INFORMATION#1
                     2446 ── CUMULATIVE COST | NO CONFIRMATION ── 2446A
                     2447 ── NODE ID
                     2448 ── PREVIOUS NODE ID
                     2449 ── COUPLED LINK NUMBER
                     244A ── COUPLED LINK INFORMATION#1
                                  244B ── LINK ID
                                  244C ── ADJACENT NODE ID
                              COUPLED LINK INFORMATION#2
                                          :
                  NODE INFORMATION#2
                              :
```

FIG. 7
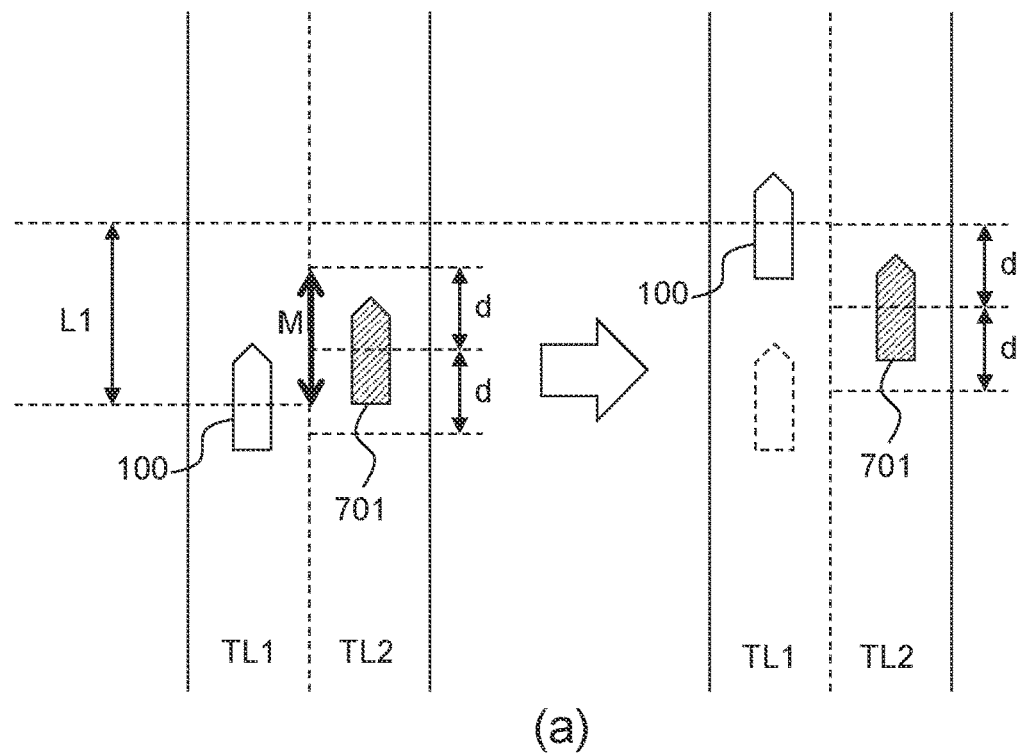
(a)
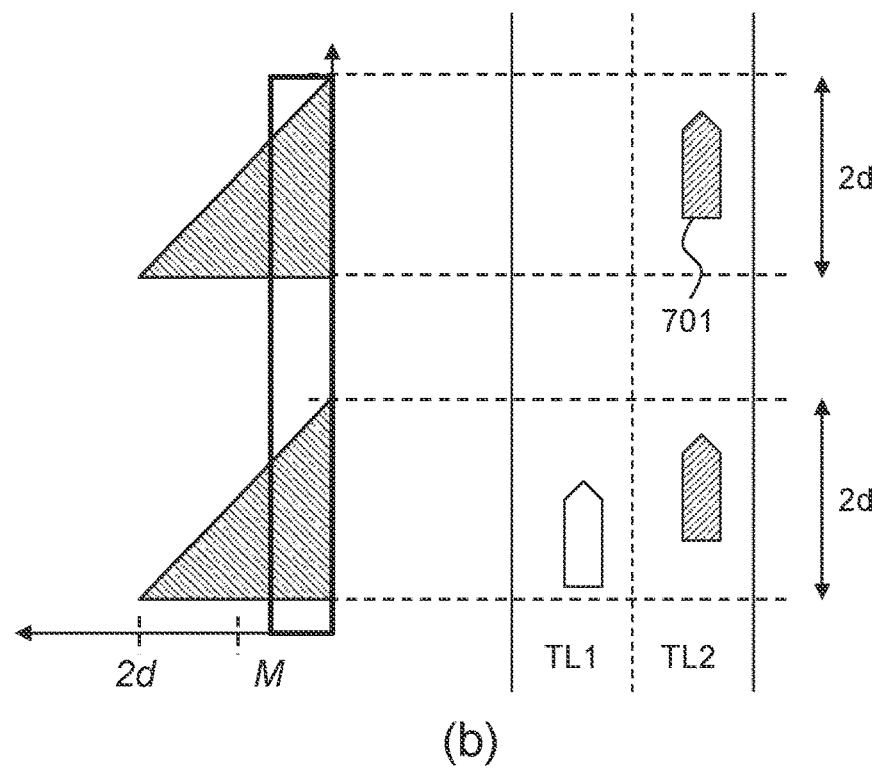
(b)

FIG. 15

| CANDIDATE PATH ID | CUMULATIVE COST | LANE CHANGE DIFFICULTY FLAG | LANE CHANGE DIFFICULTY REASON | PATH LENGTH | IN-PATH LINK NUMBER | IN-PATH LINK ID COLUMN | | |
|---|---|---|---|---|---|---|---|---|
| 1 | 50000 | 1 | BIFURCATION-WAITING CONGESTION | 25km | 30 | 1505 | 1504 | 1502 |
| 2 | 45000 | 0 | - | 30km | 35 | 900 | 901 | 902 |
| .. | .. | .. | .. | .. | .. | .. | .. | .. |

CALCULATION APPARATUS AND ARITHMETIC METHOD

CROSS-REFERENCE TO RELATED APPLICATION(S)

This application is a U.S. National Phase Patent Application of International Application Number PCT/JP2019/011179, filed on Mar. 18, 2019, which claims priority of Japanese Patent Application Number 2018-114809, filed on Jun. 15, 2018, the entire contents of all of which are incorporated herein by reference.

TECHNICAL FIELD

The present invention relates to a calculation apparatus and a arithmetic method.

BACKGROUND ART

A car navigation system (hereinafter referred to as a car navigation) configured to estimate the current position of the own-vehicle and guide the driver by displaying a road map, a path to a destination, and the like on a screen has been known. When a guide path is set in the car navigation, path calculation is typically performed to minimize the sum of link costs such as travel duration, distance, and fuel consumption amount from the origin to the destination by using digital map data (hereinafter referred to as map data) in which a road is treated as a link and an intersection is treated as a node. Such a function is called a path search function, and a Dijkstra algorithm and a wide range of algorithms based thereon have been used to achieve the function. It is assumed that information on a path searched by the car navigation is used not only for driver guide using screen display and voice but also by an automated driving vehicle to automatically travel to a destination.

The conventional car navigation sometimes searches for a path including an interval for which lane change is difficult. For example, such a path includes an interval in which a vehicle joins a main road including a plurality of lanes from the left side, changes lanes to the right side a plurality of times while traveling a short distance to the closest intersection, and turns right at the intersection. Such a path potentially causes problem to safety in guiding of the driver and control of an automated driving vehicle, and thus is not preferable. Patent Literature 1 discloses a navigation apparatus including a lane detection unit configured to detect the number of lanes that can be traveled in the traveling direction of the own-vehicle and a lane in which the own-vehicle is positioned, a congestion degree detection unit configured to detect the congestion degree of each lane that can be traveled in the traveling direction of the own-vehicle, a determination unit configured to determine the difficulty degree of right and left turning at a front-side intersection based on the detected number of lanes, the lane in which the own-vehicle is positioned, and the congestion degree, and a guide unit configured to guide a travel path in accordance with the determined difficulty degree of right and left turning.

CITATION LIST

Patent Literature

[Patent Literature 1] Japanese Patent Laid-Open No. 2007-017396

SUMMARY OF INVENTION

Technical Problem

The invention disclosed in Patent Literature 1 has room for improvement in calculation of the distance necessary for lane change.

Solution to Problem

A calculation apparatus according to a first aspect of the present invention includes a control unit configured to calculate a necessary distance that is necessary for a vehicle to perform lane change from a first travel lane to a second travel lane by combining a first distance that the vehicle travels while the vehicle waits to start the lane change, a second distance that the vehicle travels while a speed of the vehicle is adjusted, and a third distance that the vehicle travels while executing the lane change.

A arithmetic method according to a second aspect of the present invention is a arithmetic method in which a computer calculates a necessary distance that is necessary for a vehicle to perform lane change from a first travel lane to a second travel lane by combining a first distance that the vehicle travels while the vehicle waits to start the lane change, a second distance that the vehicle travels while a speed of the vehicle is adjusted, and a third distance that the vehicle travels while executing the lane change.

Advantageous Effects of Invention

According to the present invention, it is possible to calculate appropriately a distance necessary for lane change.

BRIEF DESCRIPTION OF DRAWINGS

FIG. 2 is a diagram illustrating an exemplary search table 244.

FIG. 7 is a diagram illustrating an exemplary method of calculating a start wait distance L1 at a first stage.

FIG. 15 is a diagram illustrating an exemplary candidate path table 245.

DESCRIPTION OF EMBODIMENTS

First Embodiment

A first embodiment of a navigation apparatus according to the present invention will be described below with reference to FIGS. 1 to 12. The navigation apparatus searches for a path from an origin to a destination, guides a driver, and controls a vehicle.

Figure 1:
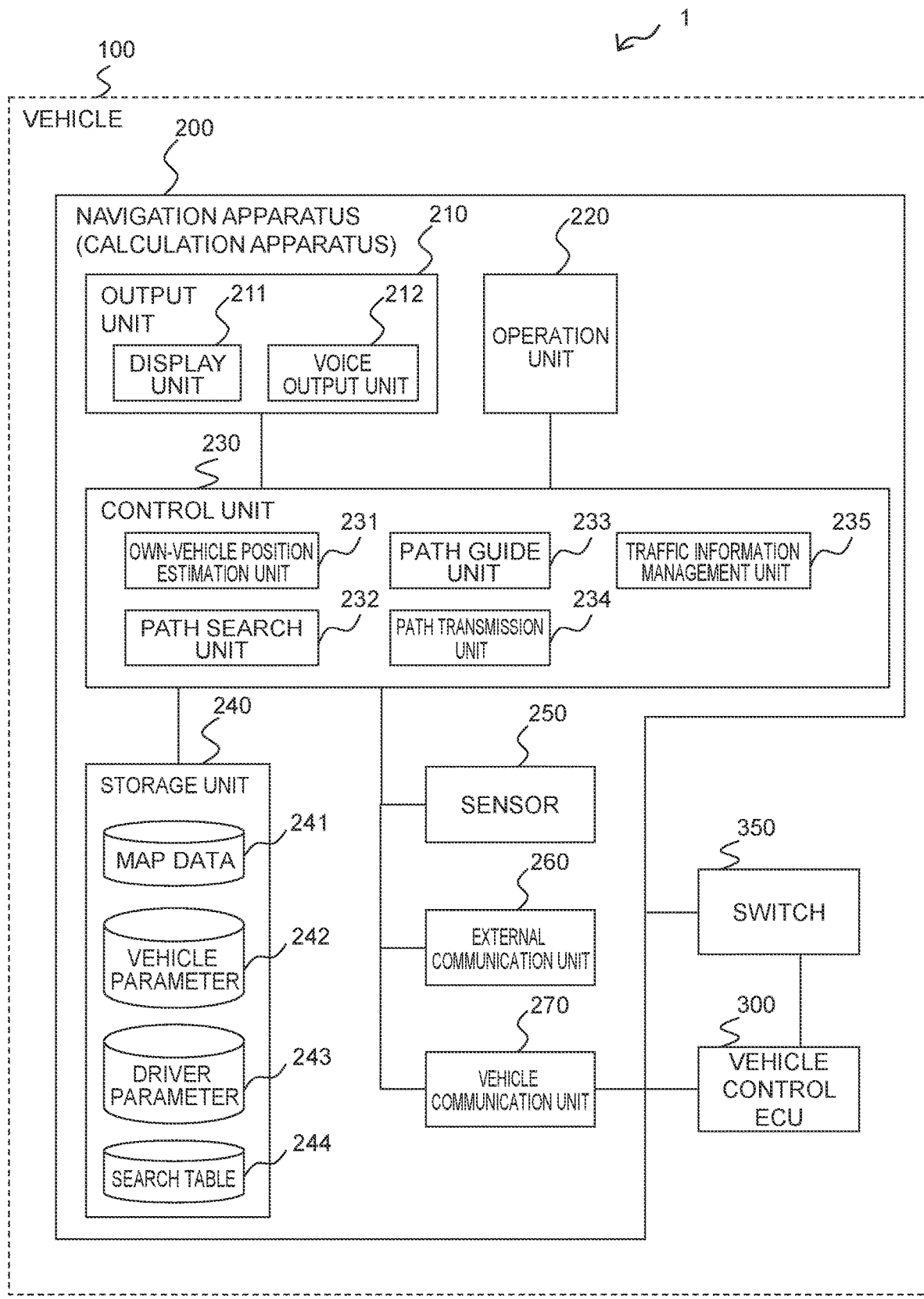
FIG. 1 is an entire configuration diagram of a path search system 1 in a first embodiment.

FIG. 1 is an entire configuration diagram of a path search system 1 in the first embodiment. The path search system 1 includes a navigation apparatus 200, a vehicle control ECU 300, and a switch 350 that are mounted on a vehicle 100. In the present embodiment, the navigation apparatus 200 is also referred to as a "calculation apparatus". Hereinafter, a person seated on a driver seat of the vehicle 100 is referred to as a "user". The vehicle 100 has two driving modes of an automated driving mode and a manual driving mode: the vehicle control ECU 300 controls the vehicle 100 in the automated driving mode; and the user controls the vehicle 100 in the manual driving mode.

The navigation apparatus 200 calculates a path that is unlikely to include an interval in which it is forced to perform difficult lane change, and presents the path to the user as described later. In addition, in the automated driving mode, the navigation apparatus 200 outputs the calculated path to the vehicle control ECU 300. The vehicle control ECU 300 operates in the automated driving mode and causes the vehicle 100 to travels along a path received from the navigation apparatus 200. The switch 350 is a switch for performing switching between automated driving and manual driving and is operated by the user. The switch 350 outputs an operation signal representing an operation by the user to the vehicle control ECU 300. Having received the operation signal from the switch 350, the on-board control ECU 300 outputs the operation signal to the navigation apparatus 200.

The navigation apparatus 200 includes an output unit 210, an operation unit 220, a control unit 230, a storage unit 240, a sensor 250, an external communication unit 260, and a vehicle communication unit 270. The output unit 210 includes a display unit 211 and a voice output unit 212. The display unit 211 is an apparatus configured to provide visual information to the user and is, for example, a display. The voice output unit 212 is an apparatus configured to provide voice information to the user and is, for example, a speaker. The output unit 210 is operated by an operation command from the control unit 230. The operation unit 220 is an apparatus configured to receive an operation from the user and transfer the operation to the control unit 230 and is, for example, a plurality of buttons. The operation unit 220 may be configured as a touch panel integrally with the display unit 211. The user performs, for example, setting of an origin and a destination by using the operation unit 220.

The control unit 230 includes a CPU as a central processing unit, a ROM as a read-only storage apparatus, and RAM as a readable-writable storage apparatus, and the CPU loads, onto the RAM, a computer program stored in the ROM and executes the computer program, thereby achieving the following functions. The control unit 230 includes, as functions thereof, an own-vehicle position estimation unit 231, a path search unit 232, a path guide unit 233, a path transmission unit 234, and a traffic information management unit 235. The functions of the control unit 230 will be described later.

The storage unit 240 is an at least readable storage apparatus but may be a non-transitory rewritable memory, for example, a flash memory so that stored information can be updated. The storage unit 240 stores map data 241, a vehicle parameter 242, a driver parameter 243, and a search table 244.

The map data 241 includes mesh information indicating an area range of a map divided into each area, for example, the range of the latitude and longitude, identifiers of links and nodes included in each mesh, and detailed information on the links and the nodes. The detailed information on a link includes the following information for calculating a link cost that is a cost for traveling through the link. Specifically, the detailed information includes an average travel duration that is an average duration taken for traveling through the link, statistical traffic information including information on congestion and road work, traffic regulation indicating that traveling is impossible, a road type indicating a type such as a high-speed road or a national road, and link property information such as automated driving permission. In addition, the detailed information includes highly accurate information in the units of lanes, such as the number of lanes included in a road included in the link, a coupling relation among the lanes, and type information of a lane border line.

The vehicle parameter 242 includes a traveling-direction acceleration rate at speed adjustment and a lateral-direction acceleration rate at lane change to be described later. The value of the vehicle parameter 242 is a value determined in advance based on the configuration of the vehicle 100, for example, an identical value for an identical car type is input as the value, and the value is not updated in the present embodiment. In addition to the traveling-direction acceleration rate at speed adjustment and the lateral-direction acceleration rate at lane change described above, the driver parameter 243 includes the step-in amounts of an acceleration pedal and a brake pedal at speed adjustment, and a steering-wheel operation angle at lane change. The value of the driver parameter 243 is determined by a driving operation by the user driving the vehicle 100. Specifically, the value of the driver parameter 243 is different for each navigation apparatus 200.

The value of the driver parameter 243 may be updated as appropriate based on sensor information when the driver performs lane change. Specific examples of the vehicle parameter 242 and the driver parameter 243 are the traveling-direction acceleration rate at speed adjustment, the acceleration/brake step-in amounts, the lateral-direction acceleration rate at lane change, and the steering-wheel operation angle. The values of these parameters may be changed for each traffic speed and each traffic density. The traffic speed and the traffic density are values that change for each travel lane as needed.

The sensor 250 includes a positioning sensor such as a global-positioning-system (GPS) unit, a gyro sensor, an acceleration sensor, and the like. The external communication unit 260 is a communication module capable of performing at least one communication among cellular communication, communication compatible with IEEE802.11, vehicle-vehicle communication, and road-vehicle communication, and performs communication with the outside of the vehicle 100.

The vehicle communication unit 270 is a communication module compatible with at least one communication standard of Controller Area Network and IEEE802.3, and performs communication with the inside of the vehicle 100. The vehicle communication unit 270 performs communication not only with the vehicle control ECU 300 and the switch 350 illustrated in FIG. 1 but also with a sensor (not illustrated), for example, a speedometer included in the vehicle 100.

The own-vehicle position estimation unit 231 estimates the position of the vehicle 100 by using information of the sensor 250 and vehicle speed information acquired from the vehicle communication unit 270. For example, the own-vehicle position estimation unit 231 acquires position information from the GPS unit at an interval of 1 second or 0.1 second, and calculates the latest position information by adding integration values of the speed and traveling direction of the vehicle 100 to the position information. The path search unit 232 searches for a path from an origin to a destination. Detailed operation of the path search unit 232 will be described later. The path guide unit 233 outputs information on the path calculated by the path search unit 232 to the output unit 210. When the drive mode is the manual driving mode, the path guide unit 233 guides the user to the path by using the information on the path and the position of the vehicle 100 calculated by the own-vehicle position estimation unit 231.

The path transmission unit 234 operates only when the driving mode is the automated driving mode, and outputs the information on the path calculated by the path search unit 232 to the vehicle control ECU 300. The traffic information management unit 235 receives a destination and latest traffic information from the outside of the vehicle 100 through the external communication unit 260. The traffic information management unit 235 stores the received traffic information in the RAM. The traffic information management unit 235 may not store directly the received traffic information but may fabricate the received traffic information so that the traffic information can be easily used by the path search unit 232 and may store the traffic information. The traffic information received by the traffic information management unit 235 also includes the situation of each lane of a path on which the vehicle 100 travels, for example, position information of vehicles stagnating in congestion at the lane.

(Search Table 244)

FIG. 2 is a diagram illustrating an exemplary search table 244. The search table 244 is stored in the storage unit 240 and produced by the path guide unit 233. The search table 244 includes an origin coordinate 2441, a destination coordinate 2442, link property information 2443, a node number 2444, and one or more fields of node information 2445.

The fields of the origin coordinate 2441 and the destination coordinate 2442 store coordinates of an origin and a destination input through the operation unit 220 by the user. However, the field of the origin coordinate 2441 may store the position of the vehicle 100 when the user sets the destination. The field of the link property information 2443 stores property information of all links included in an area set as a search target. For example, when the area set a search target includes 100 links, the field of the link property information 2443 stores property information of each of the 100 links.

The field of the node number 2444 stores the total number of nodes included in the area set as a search target. Each field of the node information 2445 stores information on a node. The number of pieces of the node information 2445 included in the search table 244 is equal to a value stored in the field of the node number 2444. Each field of the node information 2445 includes a cumulative cost 2446 of a node (hereinafter referred to as a "target node"), "no confirmation" 2446A, a node ID 2447, a previous node ID 2448, a coupled link number 2449, and one or more pieces of coupled link information 244A.

The field of the cumulative cost 2446 stores a cumulative cost from the origin to the target node, which is calculated through the process of path search. However, until the cumulative cost calculation is performed, the field stores an initial value indicating that no calculation is performed, for example, blank, a symbol such as a hyphen, or 0xffff, which is an extremely large value. The field of the "no confirmation" 2446A stores whether the cumulative cost of the target node is confirmed. In an initial state, the "no confirmation" 2446A of every piece of the node information stores an initial value, for example, "not confirmed" indicating no confirmation. The field of the node ID 2447 stores the identifier of the target node. The field of the previous node ID 2448 stores the node ID of the previous node of the target node in a searched path. The field of the coupled link number 2449 stores the number of links coupled with the target node.

The coupled link information 244A exists in a number of pieces, which is equal to the number stored in the field of the coupled link number 2449. Each piece of the coupled link information 244A stores information on a link coupled with the target node. The coupled link information 244A includes a link ID 244B and an adjacent node ID 244C. The field of the link ID 244B stores the identifier of the link coupled with the target node. The field of the adjacent node ID 244C stores the node ID of a node that is coupled with the link identified by the link ID 244B but is not the target node. The above description is made on the search table 244.

(Operation Overview of Navigation Apparatus 200)

An overview of a series of processes through which the navigation apparatus 200 searches for a path will be described below. The own-vehicle position estimation unit 231 estimates, in a short temporal period, for example, 1 second, the position of the vehicle 100 by using the information of the sensor 250, the vehicle speed information acquired from the vehicle communication unit 270, and the like. When the user performs a destination setting operation through the operation unit 220, the path search unit 232 searches for a path from an origin to a destination while updating the search table 244. The path search unit 232 may use, for example, a Dijkstra algorithm for the path search. The path search unit 232 performs the path search with reference to the map data 241, the vehicle parameter 242, and the driver parameter 243. The path search unit 232 may further use the traffic information received from the outside by the traffic information management unit 235.

(Operation of Path Search Unit 232)

Figure 3:
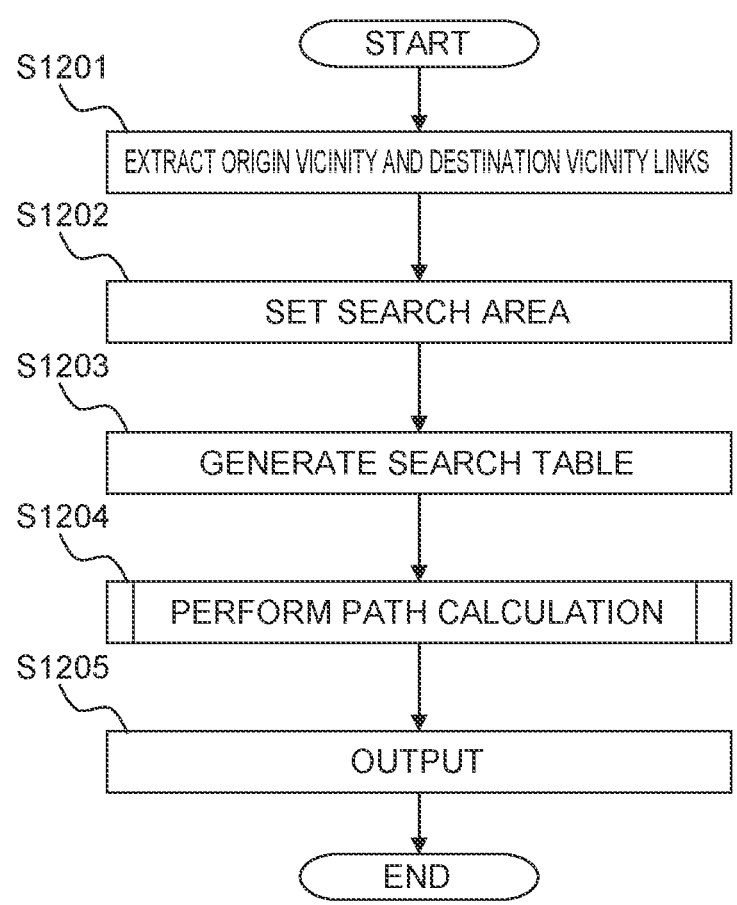
FIG. 3 is a flowchart illustrating operation of a path search unit 232.

FIG. 3 is a flowchart illustrating operation of the path search unit 232. The path search unit 232 starts operation described below once the user inputs an origin and a destination. However, the user may not input an origin, but the position of the vehicle 100 when the user sets a destination may be used as an origin.

First, the path search unit 232 extracts links nearest to the set origin and destination as a vicinity link of the origin and a vicinity link of destination, respectively (S1201). Subsequently, the path search unit 232 sets an area in which path search is to be performed (S1202). This search area is set as, for example, a rectangular area including both the origin and the destination. Subsequently, the path search unit 232 produces the search table 244 with reference to the map data 241 included in the search area (S1203). The search table 244 at S1203 is as follows. Specifically, the inputs from the user are reflected on the fields of the origin coordinate 2441 and the destination coordinate 2442. The fields of the link property information 2443 and the node number 2444 store property information of all links and the number of all nodes, respectively, included in the area set at S1202. In each piece of the node information 2445, initial values are input to the fields of the cumulative cost 2446, the "no confirmation" 2446A, and the previous node ID 2448, and information obtained from the map data 241 is stored in the other fields.

Subsequently, the path search unit 232 calculates, by using an algorithm such as the Dijkstra algorithm, a path through which the cumulative cost from the vicinity link of the origin to the vicinity link of destination is minimum (S1204). Details of the path calculation will be described later. Lastly, the path search unit 232 outputs the path through which the cumulative cost is minimum, as a result of the calculation, to the path guide unit 233 and the path transmission unit 234, and then ends the processing illustrated in FIG. 3.

(Details of S1204)

Figure 4:
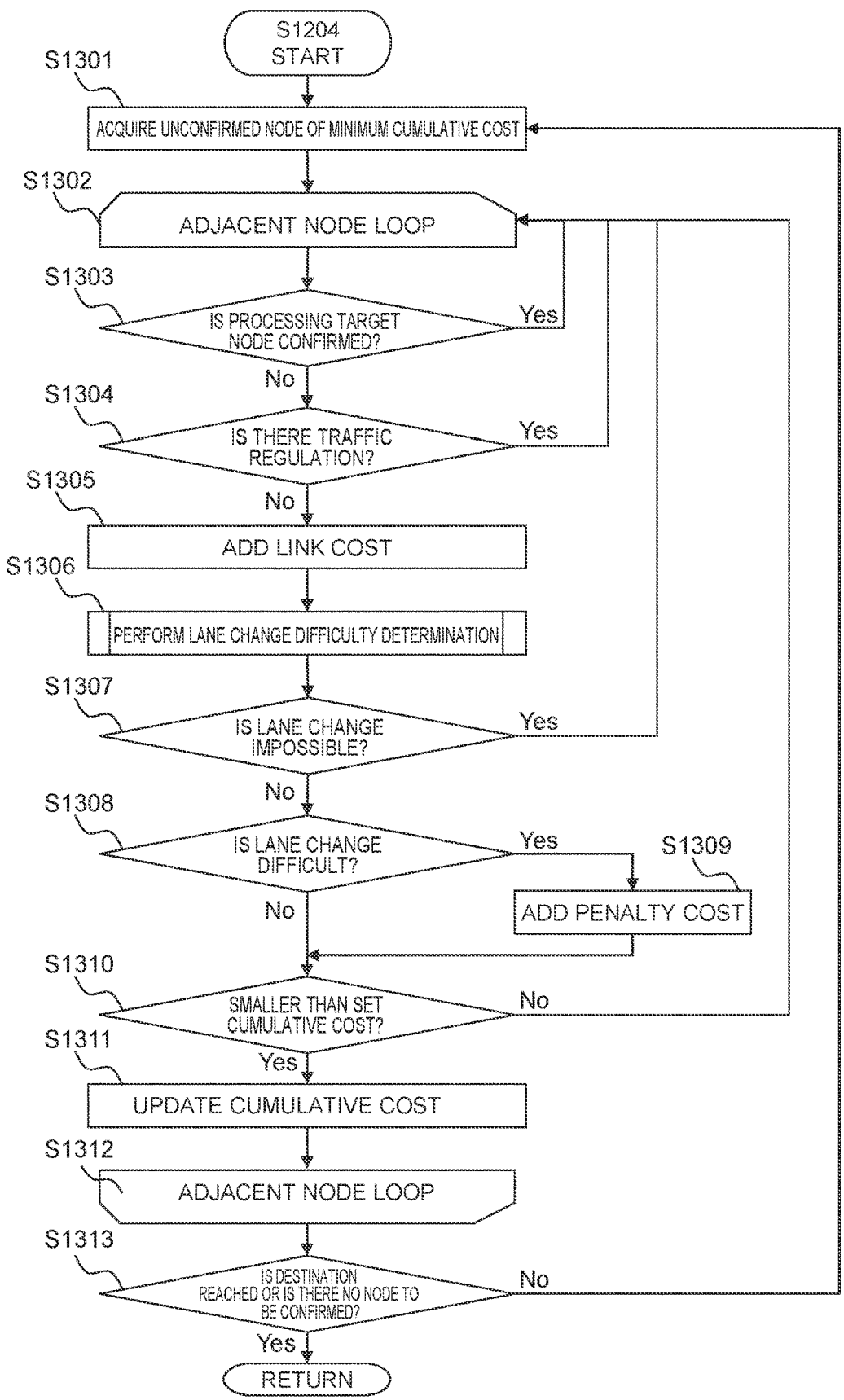
FIG. 4 is a flowchart illustrating details of S1204 in FIG. 3.

FIG. 4 is a flowchart illustrating details of the path calculation by the path search unit 232, in other words, S1204 in FIG. 3. FIG. 4 illustrates the path calculation using the Dijkstra algorithm. In the Dijkstra algorithm, the cumulative cost from the origin is confirmed one by one for each node included in the search area. The node for which the cumulative cost is confirmed starts at a vicinity node of the origin, the cumulative cost of a node coupled with the node for which the cumulative cost is confirmed is sequentially confirmed, and the calculation ends when the cumulative cost of a vicinity node of the destination is confirmed. Hereinafter, a node for which the cumulative cost is not confirmed, in other words, a node having the initial value of "not confirmed" in the field of the "no confirmation" 2446A is referred to as an "unconfirmed node". In addition, a node for which the cumulative cost is confirmed, in other words, a node having information indicating confirmation, for example, the value of "confirmed" in the field of the "no confirmation" 2446A is referred to as a "confirmed node". At a timing when the processing illustrated in FIG. 4 starts as described above, the "no confirmation" 2446A has the initial value for each node, and thus all nodes are unconfirmed nodes.

At S1301, the path search unit 232 specifies a node for which the cumulative cost is minimum among the unconfirmed nodes, and sets the specified node as a confirmed node. In other words, the path search unit 232 rewrites the value of the field of the "no confirmation" 2446A of the unconfirmed node for which the cumulative cost is minimum to information indicating that the cost is confirmed, for example, "confirmed". However, when S1301 is executed for the first time, zero is stored in the cumulative cost 2446 included in the node information 2445 of the vicinity node of the origin, and "confirmed" is stored in the "no confirmation" 2446A thereof.

Subsequently, each node adjacent to a node set as a confirmed node at S1301 (hereinafter referred to as a "latest confirmed node") is set as a processing target node, and processing at S1303 to S1311 is executed for each node (S1302). At S1303, the path search unit 232 determines whether the processing target node is already confirmed. When the processing target node is already confirmed, in other words, the processing target node is determined as a confirmed node, the path search unit 232 returns to S1302. When the processing target node is determined as an unconfirmed node, the path search unit 232 proceeds to S1304. At S1304, the path search unit 232 determines whether traffic regulation is included in the property of a link between the latest confirmed node and the processing target node. When having performed the positive determination at S1304, the path search unit 232 returns to S1302. When having performed the negative determination, the path search unit 232 proceeds to S1305.

At S1305, the path search unit 232 calculates the link cost of the link coupling the latest confirmed node and the processing target node, and temporarily stores the sum of the calculated link cost and the cumulative cost 2446 of the latest confirmed node in the RAM. The link cost calculation considers, for example, the average travel duration and link property information of the link, and the link traffic information received from the outside. Subsequently at S1306, the path search unit 232 performs difficulty determination of lane change as described later. Subsequently at S1307, the path search unit 232 determines whether a result of the difficulty determination at S1306 is "lane change is impossible". When having determined that the result of the difficulty determination is "lane change is impossible", the path search unit 232 returns to S1302. When having determined that the result of the difficulty determination is not "lane change is impossible", the path search unit 232 proceeds to S1308.

At S1308, the path search unit 232 determines whether the result of the difficulty determination at S1306 is "lane change is difficult". When having determined that the result of the difficulty determination is "lane change is difficult", the path search unit 232 adds a predetermined penalty cost to the cumulative cost recorded in the RAM at S1305 so that the link is unlikely to be included in a path, (S1309), and proceeds to S1310. When having determined that the result of the difficulty determination is not "lane change is difficult", the path search unit 232 proceeds to S1310.

At S1310, the path search unit 232 determines whether the cumulative cost recorded in the RAM at S1305 is smaller than the value of the cumulative cost 2446 of the processing target node. When having determined that the cumulative cost recorded in the RAM is smaller, the path search unit 232 updates the value of the cumulative cost 2446 in the search table 244 with the value recorded in the RAM (S1331), and proceeds to S1312. When having determined that the cumulative cost recorded in the RAM is equal to or larger than the value of the cumulative cost 2446, the path search unit 232 returns to S1302 without updating the value of the cumulative cost 2446.

At S1312, when having determined that S1303 to S1311 are all executed for all nodes adjacent to the latest confirmed node as processing targets, the path search unit 232 proceeds to S1313. Otherwise, the path search unit 232 changes the processing target node to the next adjacent node and returns to S1302. At S1313, the path search unit 232 determines whether the vicinity link of destination is reached, in other words, the value of the "no confirmation" 2446A of the vicinity link of destination is information indicating confirmation, for example, "confirmed" or whether there is no node to be confirmed (S1312). In either case, the path search unit 232 ends the processing illustrated in FIG. 4 and proceeds to S1205. In neither one of the cases, the path search unit 232 returns to S1301 to continue the path calculation.

(Details of S1306)

Figure 5:
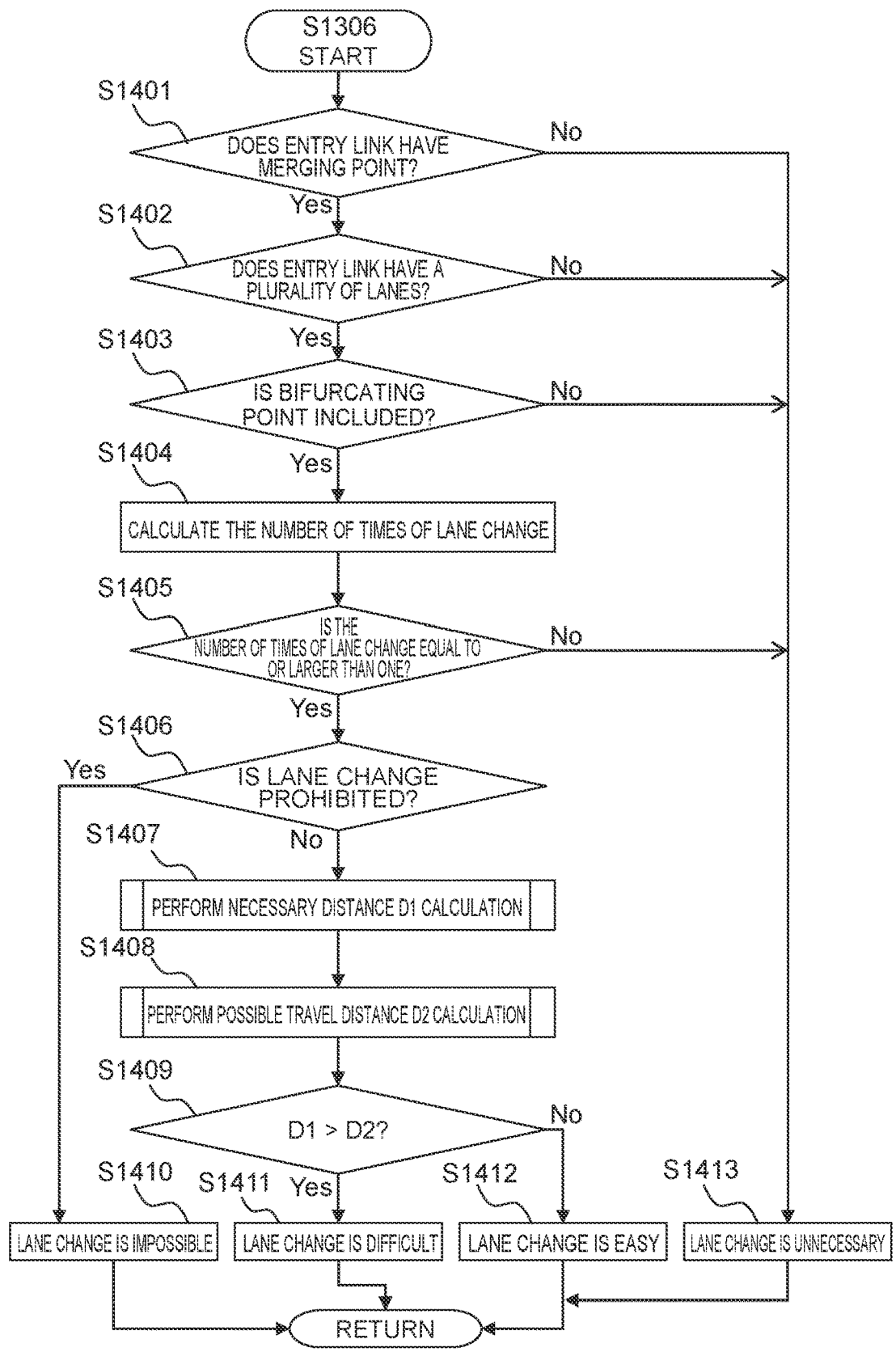
FIG. 5 is a flowchart illustrating details of S1306 in FIG. 4.

FIG. 5 is a flowchart illustrating details of the difficulty determination of lane change, in other words, S1306 in FIG. 4. In the difficulty determination of lane change, the path search unit 232 refers to the map data 241 and determines whether lane change is needed, whether lane change is possible, and whether lane change is difficult. Hereinafter, the link coupling the latest confirmed node and the processing target node is referred to as an "entry link".

First, the path search unit 232 determines whether a merging point to a main road exists in the entry link (S1401). The path search unit 232 traces nodes in the direction from the processing target node to the latest confirmed node, and determines whether a merging point to a main road exists in a certain distance, for example, 1 km. For example, a merging point is determined to be a place where a ramp or a crossover is coupled with a main road in a case of a high-speed road, or a place coupled with an arterial road to the right or left at an intersection with no traffic light in a case of a general road. When having determined that no merging point exists (NO at S1401), the path search unit 232 proceeds to S1413. When having determined that a merging point exists, the path search unit 232 determines whether the entry link includes a plurality of lanes (S1402). The path search unit 232 performs the determination with reference to the number of lanes of the entry link, which is included in the map data 241. When having determined that the entry link does not include a plurality of lanes, the path search unit 232 proceeds to S1413.

When having determined that the entry link includes a plurality of lanes, the path search unit 232 determines whether a bifurcation point is included in a road extending from the entry link to the processing target node (S1403). The path search unit 232 determines whether a bifurcation point is included based on, for example, the angle between the entry link coupled with the processing target node and another link. When having determined that no bifurcation point is included, the path search unit 232 determines that "lane change is unnecessary" (S1413), and ends the processing illustrated in FIG. 5. When having determined that a bifurcation point is included, the path search unit 232 calculates the number of times of lane change needed from the merging point to the bifurcation point (S1404). The path search unit 232 calculates the number of times of lane change by using coupling relation information of each lane, which is included in the map data 241, based on the correspondence relation between a lane, entry to which is possible at merging and a lane, exit from which is possible at bifurcation. Information on the number of times of lane change corresponding to this interval may be stored in the map data 241 in advance and read by the path search unit 232.

When having determined that the number of times of lane change is zero (NO at S1405), the path search unit 232 proceeds to S1413. When having determined that the number of times of lane change is one or more (YES at S1405), the path search unit 232 determines whether lane change is prohibited by traffic regulation or the like (S1406). The path search unit 232 performs the determination with reference to type information of a lane border line, which is included in the map data 241. When having determined that lane change is prohibited, the path search unit 232 proceeds to S1410.

When having determined that lane change is not prohibited, the path search unit 232 calculates a necessary distance D1 (S1407) that is a distance necessary for lane change, and a possible travel distance D2 (S1408) that is a distance available for lane change. The processing at S1407 and S1408 will be described later. The path search unit 232 compares the necessary distance D1 and the possible travel distance D2. When having determined that the necessary distance D1 is longer than the possible travel distance D2 (S1409), the path search unit 232 proceeds to S1411. Otherwise, the path search unit 232 proceeds to S1412.

At S1410, the path search unit 232 determines that "lane change is impossible", and ends the processing illustrated in FIG. 5. At S1411, the path search unit 232 determines that "lane change is difficult", and ends the processing illustrated in FIG. 5. At S1412, the path search unit 232 determines that "lane change is easy", and ends the processing illustrated in FIG. 5. At S1413, the path search unit 232 determines that "lane change is unnecessary", and ends the processing illustrated in FIG. 5. Specifically, the processing illustrated in FIG. 5 classifies the processing target node as a node of "lane change is impossible", "lane change is difficult", "lane change is easy", or "lane change is unnecessary".

(Overview of Calculation of Distance D1 Necessary for Lane Change)

Figure 6:
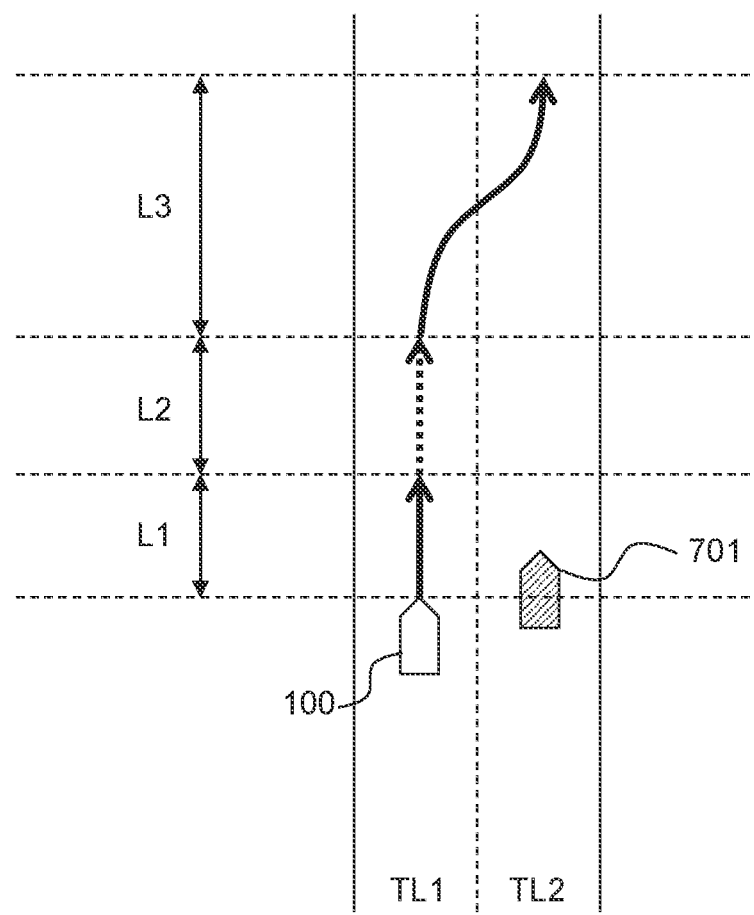
FIG. 6 is a diagram illustrating an overview of calculation of a distance necessary for lane change.

FIG. 6 is a diagram illustrating an overview of calculation of the distance D1 necessary for lane change. In the present embodiment, lane change operation is divided into three stages as illustrated in FIG. 6. A distance traveled at the first stage is L1, a distance traveled at the second stage is L2, and a distance traveled at the third stage is L3. In an example illustrated in FIG. 6, the own-vehicle 100 travels in a first travel lane TL1, and an other-vehicle 701 travels in a second travel lane TL2 adjacent thereto at a speed slightly slower than that of the own-vehicle 100. Hereinafter, a travel lane before lane change is also referred to as a "change origin lane", and a travel lane after lane change is also referred to as a "change destination lane". In addition, the vehicle 100 on which the navigation apparatus 200 is mounted is also referred to as the "own-vehicle" 100 for distinction from other vehicles.

Consider a case in which, at lane change from the first travel lane TL1 to the second travel lane TL2, the own-vehicle 100 cannot swiftly perform the lane change due to the existence of the other-vehicle 701. First at the first stage, the own-vehicle 100 waits in the change origin lane until a sufficient space becomes available in the second travel lane TL2 as the change destination. A distance traveled at the first stage is referred to as a "start wait distance L1". The start wait distance L1 increases as the traffic density of the change destination lane increases, in particular.

Subsequently, at the second stage, the speed of the own-vehicle 100 is adjusted to the traffic speed at the second travel lane TL2 as the change destination lane. Acceleration is performed when the traffic speed at the second travel lane TL2 is higher than the speed of the own-vehicle 100, or deceleration is performed when the traffic speed at the first travel lane TL1 is higher than the traffic speed at the second travel lane TL2. A distance traveled while adjustment is performed to the speed at the change destination lane through acceleration or deceleration at the second stage is referred to as a "speed adjustment distance L2". The speed adjustment distance L2 is affected by the traffic speeds at the change origin lane and the change destination lane, and the magnitude of acceleration rate at acceleration and deceleration, which is different among drive executors.

Lastly at the third stage, the steering-wheel is operated to execute the lane change. A distance actually traveled during the lane change at the third stage is referred to as a "lane change distance L3". It is thought that the lane change distance L3 is affected by handling of the steering-wheel, which is different mainly among drive executors (a steering control parameter and the like in a case of an automated driving system).

A distance necessary for lane change is calculated by adding the start wait distance L1, the speed adjustment distance L2, the lane change distance L3 at the first to third stages for the number of times of necessary lane change. Hereinafter, the first stage, the second stage, and the third stage will be each described below in detail.

(First Stage of Lane Change)

FIG. 7 is a diagram illustrating an exemplary method of calculating the start wait distance L1 at the first stage. The other-vehicle 701 is a vehicle traveling in the second travel lane TL2 as the change destination and nearest to the own-vehicle 100. The own-vehicle 100 travels at a constant speed until a space of a distance d on the front and back sides from the central position of the other-vehicle 701 is generated. A distance M needed for separation from the other-vehicle 701 to generate the space of the distance d depends on the positional relation between the own-vehicle 100 and the other-vehicle 701 when attempt for lane change is started, in other words, at the start of the first stage.

The average value of the start wait distance L1 is estimated with taken into consideration a traffic speed V11 of the own-vehicle 100 at the first stage, a traffic speed V2 at the second travel lane TL2, and a traffic density K2 at the second travel lane TL2. The traffic speed V11 and the traffic speed V2 have values calculated from average speeds at the first travel lane TL1 and the second travel lane TL2, respectively, acquired from the map data 241. It is assumed that the own-vehicle 100 is faster than the other-vehicle 701, in other words, the relation of V11>V2 holds. The traffic density is the number of vehicles existing in a unit distance. When the own-vehicle 100 attempts lane change while the own-vehicle and the other-vehicle are traveling in a positional relation as illustrated on the left side in FIG. 7(a), the space of the distance d is generated through separation of the distance M is made thereafter. The value of the distance d may be a fixed value held in the path search unit 232, for example, the average value of a vehicle length, or may be set in accordance with the traffic speed at the change destination lane with taken into consideration a stop distance of the vehicle. The average value of the distance M is given by Expression 1 below.

$$M = 2 \times K2 \times d^2 \qquad \text{(Expression 1)}$$

Expression 1 will be described below with reference to FIG. 7(b). When no other-vehicle 701 exists in the distance d on the sides, front, and back of the own-vehicle 100, the distance M needed for separation from the other-vehicle 701 to generate the space of the distance d is zero. However, when the own-vehicle 100 is faster than the other-vehicle 701 and the other-vehicle 701 is ahead of the own-vehicle 100 by a distance slightly shorter than the distance d, the distance M is 2d. Specifically, as illustrated in each triangle on the left side in FIG. 7(b), the distance M is determined by the relative positions of the own-vehicle 100 and the other-vehicle 701. The distance M is the area of the triangle averaged with the existence probability of the other-vehicle 701. Since the area of one triangle is $2d^2$ and the existence probability of the other-vehicle 701, in other words, the traffic density is K2, the distance M is given by Expression 1 described above.

The traffic density K2 has a value included in a traffic situation acquired from the traffic information management unit 235 by the path search unit 232. Instead of being acquired from the traffic information management unit 235, the traffic density K2 may be included in the statistical traffic information stored in the map data 241. When the traffic situation acquired from the traffic information management unit 235 or the statistical traffic information stored in the map data 241 includes, instead of the traffic density, information on a traffic amount that is the number of passing vehicles in a unit duration at a place, the traffic density can be calculated indirectly as follows. Specifically, traffic density K is calculated based on a fact that "traffic amount Q=traffic density K×traffic speed V" typically holds. The acquired traffic situation or the statistical traffic information can be directly used when they are information per lane, or the traffic density of each lane is calculated by using the number of lanes of a road when they are information per road.

A duration T1 until the own-vehicle 100 and the other-vehicle 701 becomes separated by the distance M is given by Expression 2 below.

$$T1 = M/|V2 - V11| \qquad \text{(Expression 2)}$$

The traffic speed V2 has a value included in the traffic situation acquired from the traffic information management unit 235 by the path search unit 232. The traffic speed V2 may be included in the statistical traffic information stored in the map data 241. The acquired traffic situation or the statistical traffic information can be directly used when they are information per lane, or the traffic speed at each lane is calculated by using the number of lanes of a road when they are information per road. In addition, since speed is different between a travel lane and an overtaking lane, the traffic speed may be differentiated among lanes when information per road is interpreted.

Thus, L1 is given by Expression 3 below when the own-vehicle 100 travels constantly at the traffic speed V11 for a duration T.

$$L1 = V11 \times T \qquad \text{(Expression 3)}$$

A duration C in which the direction indicator is turned on in advance to notify a following vehicle that the own-vehicle 100 is about to perform lane change may be added to obtain Expression 4. The duration C is "three seconds" when consideration is made on a case in which, for example, a sign is required to be indicated for three seconds before traveling path change by law in Japan.

$$L1 = V11 \times (C + T) \qquad \text{(Expression 4)}$$

As described above, the start wait distance L1 can be calculated with taken into consideration the traffic speeds at the change origin lane and the change destination lane and the traffic density at the change destination lane.

(Second Stage of Lane Change)

Figure 8:
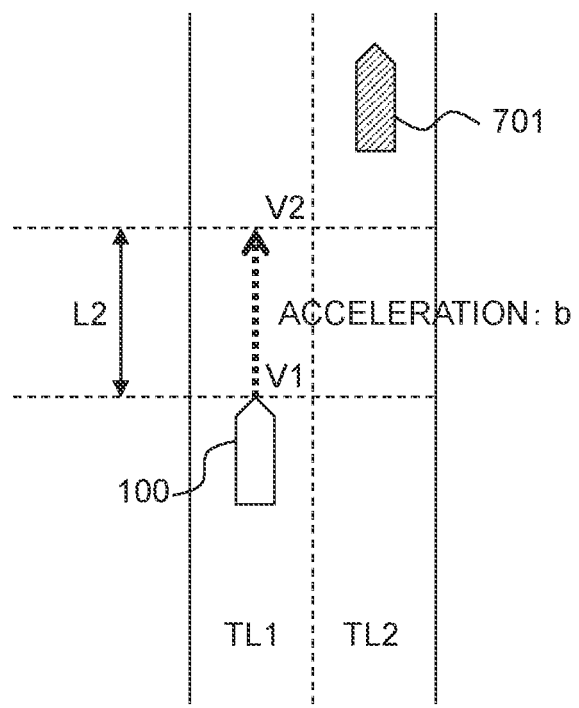
FIG. 8 is a diagram illustrating an exemplary method of calculating a speed adjustment distance L2 at a second stage.

FIG. 8 is a diagram illustrating an exemplary method of calculating the speed adjustment distance L2 at the second stage. At the second stage, until the traffic speed of the own-vehicle 100 matches the traffic speed V2 at the change destination lane, speed is adjusted at a constant traveling-direction acceleration rate b to avoid abrupt acceleration. At the second stage, the own-vehicle 100 has an initial speed V210. Similarly to the first stage of lane change, the initial speed V210 and the traffic speed V2 at the change destination lane are included in the traffic situation acquired from the traffic information management unit 235 or the statistical traffic information stored in the map data 241. The traveling-direction acceleration rate b is a parameter that differs depending on a drive executor of the vehicle. For example, it is thought that the parameter is different between persons in the manual driving mode, in other words, when the drive executor is the driver, and the parameter is different depending on car type and grade and the like in the automated driving mode, in other words, when the drive executor is the automated driving system. Specifically, the traveling-direction acceleration rate b is read from the vehicle parameter 242 in the automated driving mode, and read from the driver parameter 243 in the manual driving mode.

A duration T2 taken for speed adjustment is given by Expression 5 below.

$$T2=|V2-V210|/b \quad \text{(Expression 5)}$$

The speed adjustment distance L2 is given by Expression 6 below by using T2.

$$L2=V210 \times T2+(\tfrac{1}{2}) \times b \times T2^2 \quad \text{(Expression 6)}$$

As described above, the speed adjustment distance L2 can be calculated with taken into consideration the change origin lane and the traffic speed at the change destination lane, and the traveling-direction acceleration rate, which is different for each drive executor.

(Third Stage of Lane Change)

Figure 9:
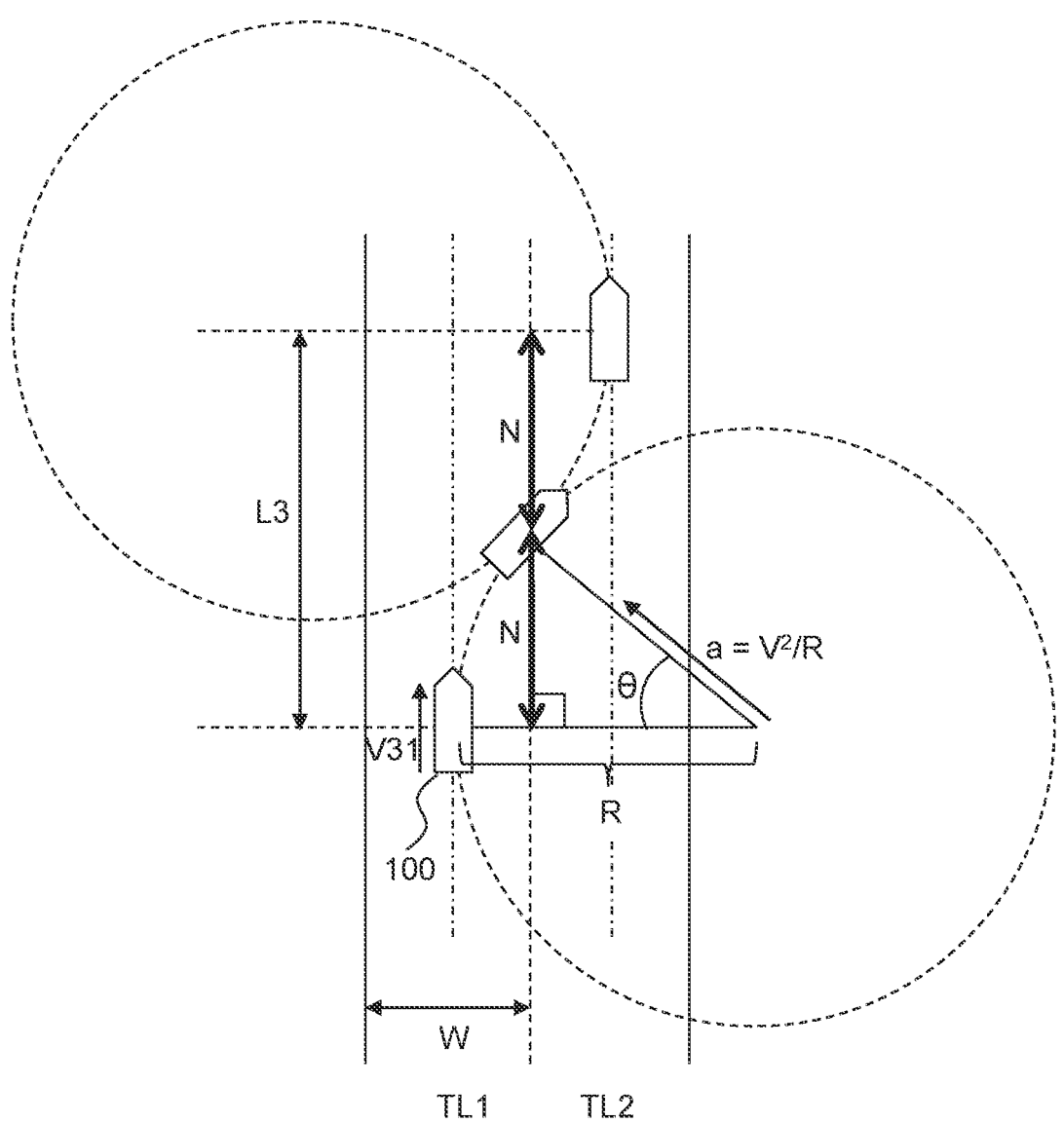
FIG. 9 is a diagram illustrating an exemplary method of calculating a lane change distance L3 at a third stage.

FIG. 9 is a diagram illustrating an exemplary method of calculating the lane change distance L3 at the third stage. The own-vehicle 100 travels, from the first travel lane TL1 to the second travel lane TL2, on the circumference of two virtual circles having equal radii. To avoid abrupt change of the traveling direction, the own-vehicle 100 has a speed constant on the circumference, in other words, a constant acceleration rate a in the radial direction. The acceleration rate a in the radial direction is a parameter different for each drive executor of the vehicle. For example, the parameter is different between persons when the drive executor is the driver, and the parameter is different depending on car type and grade and the like when the drive executor is the automated driving system. Specifically, the acceleration rate a in the radial direction is read from the vehicle parameter 242 in the automated driving mode, and read from the driver parameter 243 in the manual driving mode. The acceleration rate a in the radial direction is also referred to as a "lateral-direction acceleration rate a".

A distance N traveled in the traveling direction by the own-vehicle 100 before traveling across a border line (hereinafter referred to as a lane border line) between the first travel lane TL1 and the second travel lane TL2 is given by Expression 7 below.

$$N=R \times \sin\theta \quad \text{(Expression 7)}$$

A minimum curvature radius R with which the lateral-direction acceleration rate does not exceed a is given by Expression 8 below by using a vehicle speed V31 of the own-vehicle 100. Similarly to the first stage of lane change, the vehicle speed V31 is included in the traffic situation acquired from the traffic information management unit 235 or the statistical traffic information stored in the map data 241.

$$R=V31^2/a \quad \text{(Expression 8)}$$

The angle $\theta$ corresponding to an arc traveled by the own-vehicle 100 before traveling across the lane border line is given by Expression 9 below by using a lane width w. The lane width w may be a value stored in the map data 241, or the lane width of 3.5 m for a road defined as a second type and a first grade may be used for a high-speed road in an urban region by referring to, for example, Japan Government Order on Road Design Standards.

$$\theta=\cos^{-1}(1-(w/2 \times R)) \quad \text{(Expression 9)}$$

The lane change distance L3 is given by Expression 10 below by using N.

$$L3=2 \times N \quad \text{(Expression 10)}$$

As described above, the lane change distance L3 can be calculated with taken into consideration the lateral-direction acceleration rate, which is different for each drive executor.

Specific methods of calculating the start wait distance L1, the speed adjustment distance L2, and the lane change distance L3 are described above with reference to FIGS. 7 to 9, but these calculation methods are not limited to the above-described methods. For example, as for the start wait distance L1, since it can be thought that other vehicles traveling in the change destination lane notice the own-vehicle and adjust speed when the own-vehicle 100 has turned on the direction indicator to perform lane change, a distance corresponding to the turn-on duration of the direction indicator, which is thought to depend on the traffic density, may be regarded as a distance that the own-vehicle 100 travels at a constant speed. As for the lane change distance L3, a travel distance may be calculated based on assumption that the own-vehicle 100 travels not on an arc trajectory but on a clothoid curve trajectory.

(Details of S1407)

Figure 10:
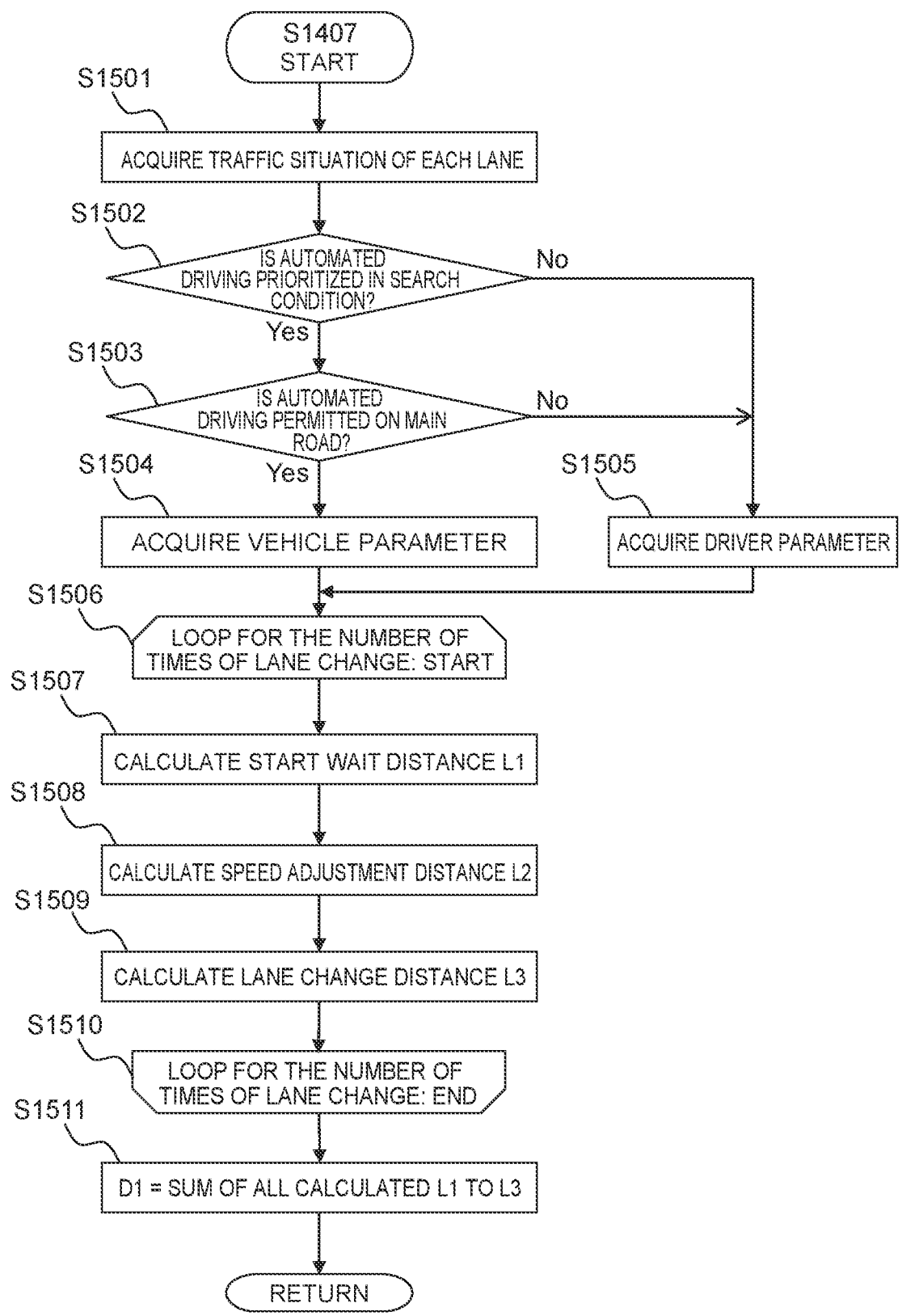
FIG. 10 is a flowchart illustrating details of S1407 in FIG. 5.

FIG. 10 is a flowchart illustrating details of the processing of calculating the distance necessary for lane change, in other words, S1407 in FIG. 5. In the flowchart illustrated in FIG. 10 calculates the distance D1 necessary for lane change by integrating the start wait distance L1, the speed adjustment distance L2, and the lane change distance L3, which are described with reference to FIGS. 7 to 9, for the number of times of lane change. Details will be described below.

First, the path search unit 232 acquires the traffic situation of each lane included in the entry link from the traffic information management unit 235 (S1501). Instead of acquiring the traffic situation from the traffic information management unit 235, the path search unit 232 may use the statistical traffic information stored in the map data 241. The acquired traffic situation can be directly used when it is information per lane, or the acquired traffic situation is considered as the traffic situation of each lane by using the number of lanes of a road when it is information per road. In addition, since speed is different between a travel lane and an overtaking lane, the path search unit 232 may differentiate the traffic speed among lanes when information per road is interpreted.

Subsequently, the path search unit 232 determines whether a search condition on execution of path search prioritizes automated driving (S1502). For example, the path search unit 232 determines that automated driving is prioritized when the driving mode of the own-vehicle 100 is the automated driving mode, or determines that manual driving is prioritized when the driving mode of the own-vehicle 100 is the manual driving mode. When having determined that automated driving is prioritized, the path search unit 232 proceeds to S1503. When having determined that automated driving is not prioritized, the path search unit 232 proceeds to S1505.

At S1503, the path search unit 232 determines whether automated driving is permitted on a main road from a merging point to a bifurcation point (S1503). For example, when a flag indicating whether automated driving is permitted is set to a link property stored in the map data 241, the determination at S1503 uses this property information. When the road type of the link is an arterial road such as a high-speed road or a national road, the path search unit 232 may determine that automated driving is permitted. When having determined that automated driving is permitted, the path search unit 232 proceeds to S1504. When having determined that automated driving is not permitted, the path search unit 232 proceeds to S1505.

At S1504, the path search unit 232 acquires the vehicle parameter 242 as a parameter for calculating the distance D1 necessary for lane change. At S1505, the path search unit 232 acquires the driver parameter 243 as a parameter for calculating the distance D1 necessary for lane change. Subsequently, the path search unit 232 repeatedly calculates the distance necessary for lane change the number of times of necessary lane change (S1506). Specifically, the start wait distance L1 (S1507), the speed adjustment distance L2 (S1508), and the lane change distance L3 (S1509) are calculated by using the traffic situation of each lane and the vehicle parameter or the driver parameter. Having repeated the processing at S1507 to S1509 the number of times of necessary lane change, the path search unit 232 proceeds to S1511 (S1510). Lastly, the path search unit 232 calculates the sum of all L1 to L3 calculated at S1507 to at S1509 and sets the sum as the necessary distance D1 (S1511). The path search unit 232 ends the processing illustrated in FIG. 10.

(Overview of calculation of possible travel distance D2)

Figure 11:
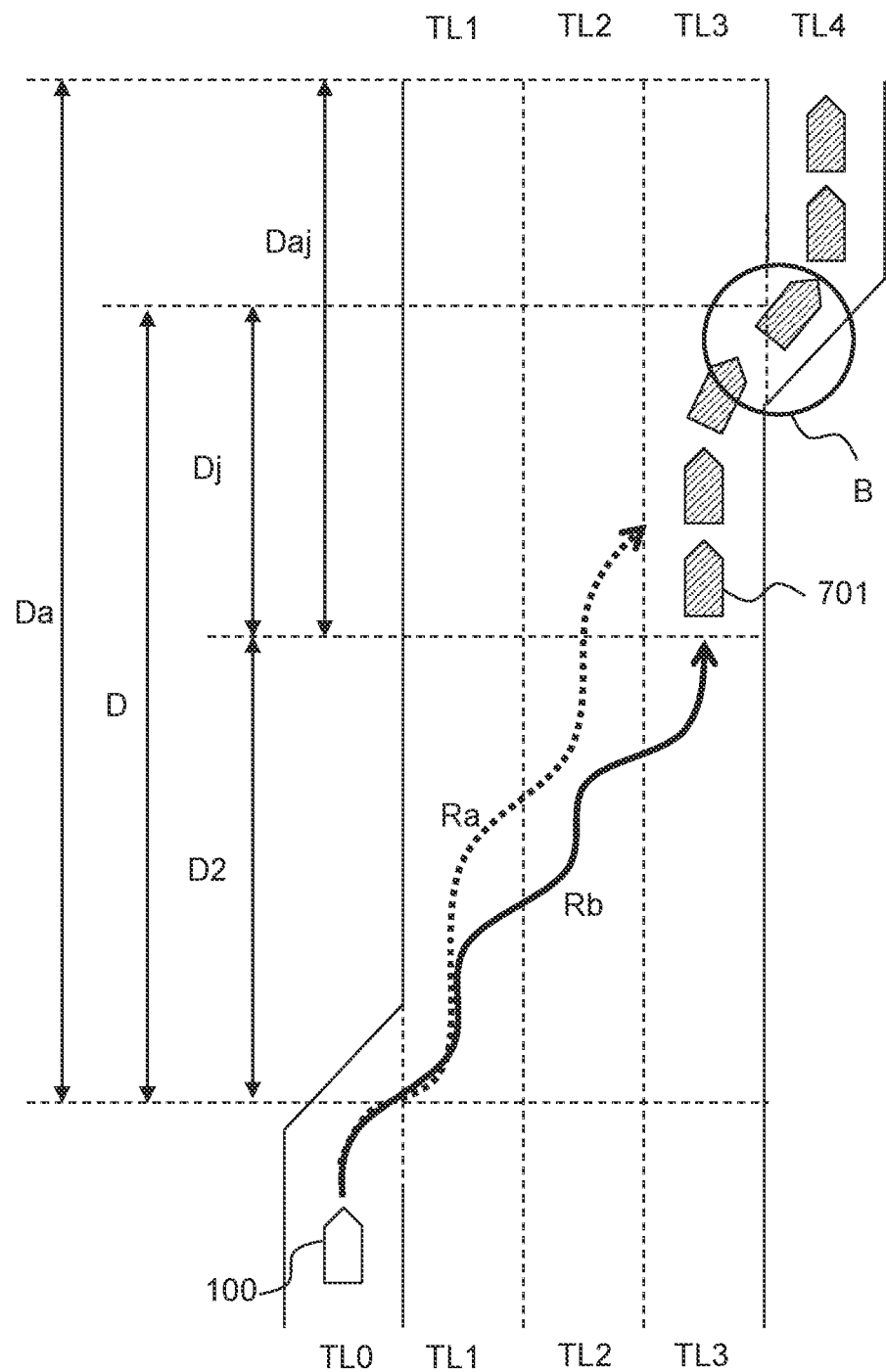
FIG. 11 is a diagram illustrating an overview of calculation of a distance D2 available for lane change.

FIG. 11 is a diagram illustrating an overview of calculation of the possible travel distance D2. The path search unit 232 performs not only distance calculation but also correction to exclude a distance that cannot be used due to congestion and the like as described below. In an example illustrated in FIG. 11, the own-vehicle 100 performs lane change from a zero-th travel lane TL0 at the left end to a fourth travel lane TL4 at the right end. The fourth travel lane TL4 exists only at an upper part of the drawing and bifurcates from a bifurcation part B of a third travel lane TL3. Entering halfway through the fourth travel lane TL4 is prohibited, and it is needed to enter the bifurcation part B to travel the fourth travel lane TL4.

In the example illustrated in FIG. 11, congestion occurs in the fourth travel lane TL4 and extends to the third travel lane TL3 beyond the bifurcation part B. In this case, it is impossible to queue at the tail end of the congestion by traveling on a trajectory Ra and thus impossible to perform lane change to the fourth travel lane TL4. Accordingly, the own-vehicle 100 needs to travel on a trajectory Rb to queue at the tail end of the congestion. In this case, the distance available for lane change is shorter by a main road part of a congestion length Dj, and lane change is more difficult. The possible travel distance D2 is a distance obtained by subtracting the congestion length Dj from a distance D from a merging point to a bifurcation point.

In the example illustrated in FIG. 11, the possible travel distance D2 is the same when lane change from the zero-th travel lane TL0 to the third travel lane TL3 is intended and a bifurcation point, for example, an intersection exists at the upper end of the drawing. More specifically, a distance Da from the merging point to the bifurcation point has a lower end the same as that of the distance D and an upper end at the upper end of the drawing. However, since vehicles are queuing in the third travel lane TL3 as well due to congestion, it is needed to travel on the trajectory Rb to queue at the tail end of the congestion, similarly to the above-described example. Thus, a congestion length Daj extends to the upper end of the drawing, and the possible travel distance D2 that is a length obtained by subtracting Daj from Da is the same in the above-described example.

(Details of S1408)

Figure 12:
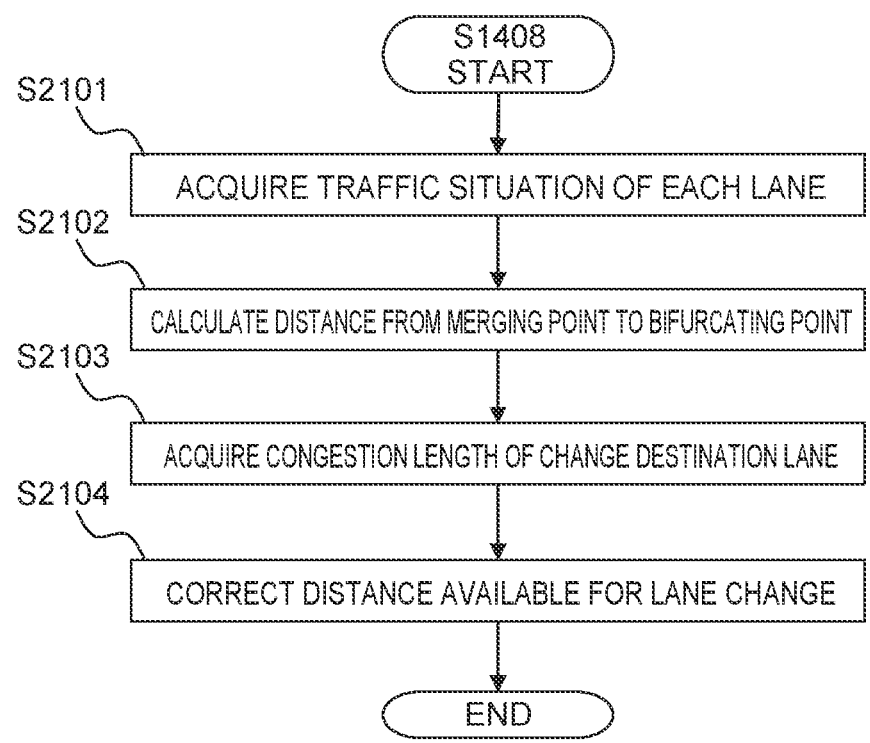
FIG. 12 is a flowchart illustrating details of S1408 in FIG. 5.

FIG. 12 is a flowchart illustrating details of the processing of calculating the possible travel distance D2, in other words, S1408 in FIG. 5. FIG. 12 illustrates processing that the path search unit 232 calculates the possible travel distance D2 with taken into consideration the length of congestion in the change destination lane. First, the path search unit 232 acquires the traffic situation of each lane (S2101). The traffic situation is acquired by a method the same as that of S1501. Subsequently, the path search unit 232 calculates the distance from a merging point to a bifurcation point (S2102). The distance may be calculated by adding link lengths stored in the map data 241 for links from the merging point to the bifurcation point. Alternatively, the distance from the merging point to the bifurcation point may be stored in the map data 241 in advance and used by the path search unit 232.

The calculated distance corresponds to the distance available for lane change before correction, for example, the distance D in the example in FIG. 11. Since a zone in which lane change is prohibited sometimes exists right before an intersection on a general road, in particular, the length of a lane change prohibited zone right before the intersection may be additionally considered instead of simply calculating the distance from the merging point to the bifurcation point.

Subsequently, the path search unit 232 acquires the congestion length of the change destination lane (S2103). The congestion length is desirably acquired not only for a lane that directly leads bifurcation, for example, the third travel lane TL3 in the example in FIG. 11 but for all travel lanes from the change origin lane to the change destination lane. This is because, for example, in FIG. 11, when no congestion occurs in the third travel lane TL3 but congestion occurs in the second travel lane TL2, lane change is potentially not completed before the bifurcation point due to the congestion in the second travel lane TL2. Lastly, the path search unit 232 corrects the distance available for lane change by subtracting the congestion length of the change destination lane acquired at S2103 from the distance available for lane change before correction, which is calculated at S2102, thereby obtaining the possible travel distance D2 (S2104).

As described above, the path search unit 232 can calculate the possible travel distance D2 with taken into consideration the congestion length of the change destination lane.

According to the first embodiment described above, the following effects can be obtained.

(1) The navigation apparatus 200 as a calculation apparatus includes the path search unit 232 configured to calculate the necessary distance D1 that is necessary for the vehicle 100 to perform lane change from the first travel lane TL1 to the second travel lane TL2 by combining the start wait distance L1 that the vehicle travels while the vehicle waits to start the lane change, the speed adjustment distance L2 that the vehicle travels while the speed of the vehicle is adjusted, and the lane change distance L3 that the vehicle travels while executing the lane change. Accordingly, the navigation apparatus 200 classifies the necessary distance D1 into the three distances and calculates the distances, and thus can appropriately calculate the distance necessary for lane change.

(2) The path search unit 232 calculates a path from an origin to a destination, calculates the necessary distance D1 for a lane movement link for which lane change is necessary, calculates the possible travel distance D2 that the vehicle 100 can travel in the lane movement link for lane change, and calculates a path that is unlikely to pass through the lane movement link when the necessary distance D1 is longer than the possible travel distance D2 (YES at S1308 in FIG. 4, S1309). Thus, the path search unit 232 can calculate a path that unlikely to include a link for which lane change is difficult. In other words, a link for which difficult lane change is forced to be performed can be excluded from the calculated path.

(3) The path search unit 232 considers the traffic density at the second travel lane in calculation of the start wait distance L1 (S1507 in FIG. 10, Expressions 1 to 3). Thus, the start wait distance L1 can be accurately calculated with taken into consideration the probability that the other-vehicle 701 exists.

(4) The path search unit 232 uses a parameter different for each control executor of the vehicle 100 in calculation of the speed adjustment distance L2 (S1508 in FIG. 10, Expressions 5 to 6). The traveling-direction acceleration rate b is thought to be different depending on the drive executor, in other words, depending on whether the vehicle 100 is controlled by the vehicle control ECU 300 or the user. Thus, the speed adjustment distance L2 can be accurately calculated by using the different parameters.

(5) The path search unit 232 uses a parameter different for each control executor of the vehicle 100 in calculation of the lane change distance L3 (S1509 in FIG. 10, Expressions 7 to 10). The acceleration rate a in the radial direction is thought to be different depending on the drive executor, in other words, depending on whether the vehicle 100 is controlled by the vehicle control ECU 300 or the user. Thus, the lane change distance L3 can be accurately calculated by using the different parameters.

(6) The path search unit 232 considers the length of congestion in the change destination lane in calculation of the possible travel distance (S2104 in FIG. 12). Thus, as illustrated in FIG. 11, the possible travel distance D2 can be calculated by subtracting the congestion length Dj from the distance D from a merging point to a bifurcation point.

(Modification 1)

The path search unit 232 may change the calculation of the necessary distance D1 in accordance with a situation. For example, when the traffic density at the change destination lane is extremely high, the calculation of the necessary distance D1 may be changed as described below.

Figure 13:
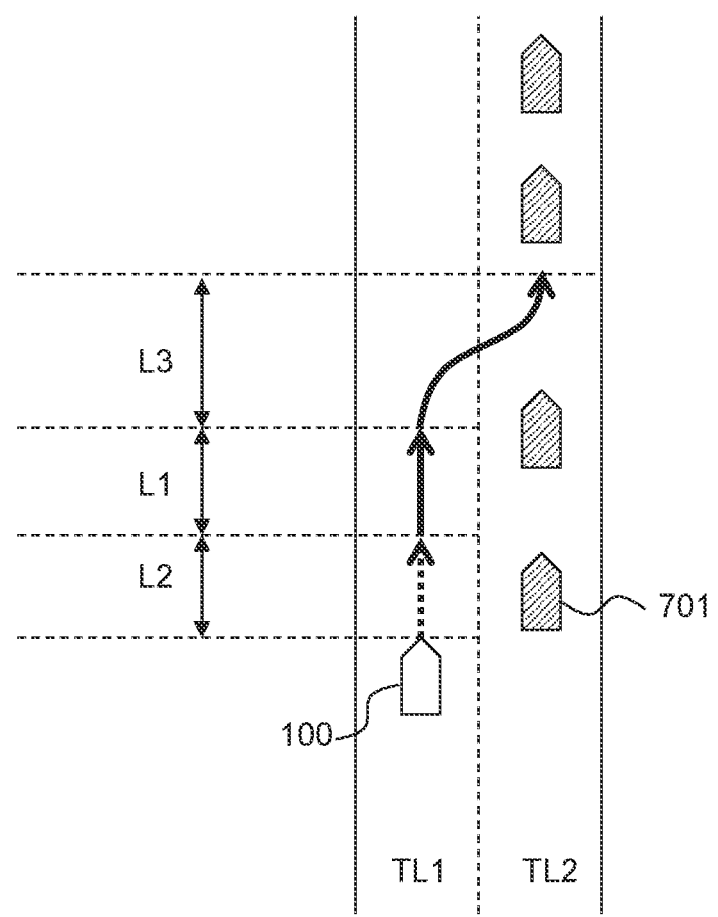
FIG. 13 is a diagram illustrating operation of lane change when traffic density at a change destination lane is extremely high in Modification 1.

FIG. 13 is a diagram illustrating lane change operation when the traffic density at the change destination lane is extremely high. When the traffic density K2 in the second travel lane TL2 as the change destination lane is higher than a traffic density K1 in the first travel lane TL1 in which the own-vehicle 100 travels by a predetermined value or a predetermined ratio, the path search unit 232 changes calculation as described below. Specifically, the path search unit 232 first adjusts the speed of the own-vehicle 100 to the traffic speed at the second travel lane TL2 and waits for start of lane change. This is because another vehicle is highly likely to enter the second travel lane TL2 during the speed adjustment after the lane change start wait. Specifically, in this case, the speed adjustment is performed first, the lane change start wait is performed subsequently, and the lane change is executed lastly.

The path search unit 232 may change the calculation method on a condition based on evaluation of the traffic density at a change destination travel lane. Specifically, when the traffic density at the change destination travel lane is higher than a predetermined value, the calculation method may be changed as described above.

(Modification 2)

The path search unit 232 may change the calculation of the necessary distance D1 in accordance with a situation. For example, when the traffic density at a change origin lane, in other words, a travel lane in which the own-vehicle 100 is current traveling is extremely high, the calculation of the necessary distance D1 may be changed as described below.

Figure 14:
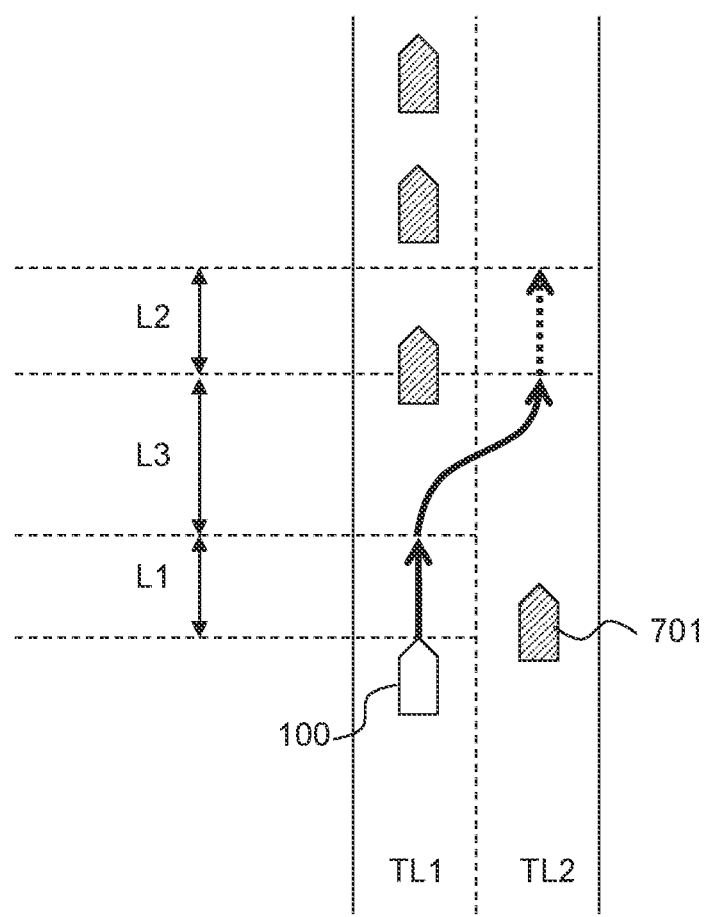
FIG. 14 is a diagram illustrating operation of lane change when traffic density at change origin lane is extremely high in Modification 2.

FIG. 14 is a diagram illustrating lane change operation when the traffic density at the change origin lane is extremely high. When the traffic density K1 at the first travel lane TL1 in which the own-vehicle 100 travels is higher than the traffic density K2 at the second travel lane TL2 as the change destination lane by a predetermined value or predetermined ratio, the path search unit 232 changes calculation as described below. Specifically, the path search unit 232 first performs lane change start wait, subsequently executes lane change at the current speed, and lastly in the change destination lane, adjusts the speed to the traffic speed at the second travel lane TL2. This is because collision with a preceding vehicle or a following vehicle potentially occurs when acceleration or deceleration is attempted in the change origin lane at which the traffic density is high. Specifically, in this case, the lane change start wait is performed first, the lane change is performed subsequently, and the speed adjustment is performed lastly.

The path search unit 232 may change the calculation method on a condition based on evaluation of only the traffic density at the current travel lane. Specifically, the calculation method may be changed as described above when the traffic density of the current travel lane is higher than a predetermined value.

(Modification 3)

A notification apparatus configured to perform notification without path search may execute the processing illustrated in FIG. 10. However, in the present modification, change is made so that whether a main road is to be traveled by automated driving is determined at S1502 in FIG. 10. The other processing is the same. In the present modification, for example, information on a path obtained by any calculation method is read, and the possible travel distance D1 is calculated by the method illustrated in FIG. 10 in which S1502 is changed. Then, the notification apparatus notifies the user or the vehicle control ECU 300 that lane change needs to be started when a position at the possible travel distance D1 from a bifurcation point is reached at latest. The notification apparatus switches notification targets in accordance with the operation mode of the vehicle 100. The notification apparatus notifies, for example, the user of "please start lane change before traveling by xx meters".

According to the present modification, a useful function by using the necessary distance D1 can be achieved by having a function to calculate the necessary distance D1 for lane change. Specifically, without a path search function like the navigation apparatus 200, it is possible to calculate the necessary distance D1 and provide a notification of the timing of lane change and a notification of the deadline of lane change. The notification apparatus may further calculate the possible travel distance D2 and determine whether lane change is possible by comparing the necessary distance D1 and the possible travel distance D2.

Second Embodiment

A second embodiment of the navigation apparatus according to the present invention will be described below with reference to FIGS. 15 to 16. In the following description, a component the same as that of the first embodiment is denoted by the same reference sign, and difference therebetween will be mainly described. Features not particularly described are the same as those of the first embodiment. The present embodiment is different from the first embodiment mainly in that a plurality of paths are presented to the user.

(System Configuration)

The navigation apparatus 200 in the second embodiment has a hardware configuration the same as that of the first embodiment. However, the computer program stored in the ROM is partially different, and the storage unit 240 further stores a candidate path table 245 to be described later. The candidate path table 245 stores information on a plurality of paths to be presented to the user. The candidate path table 245 is produced by the path search unit 232.

(Operation)

The path search unit 232 in the second embodiment calculates a plurality of paths. For example, when 10 paths are to be calculated at maximum, S1313 in the flowchart illustrated in FIG. 4 may be changed as described below. Specifically, the path search unit 232 performs the positive determination when the tenth path to a destination is included or there is no node to be confirmed, or performs the negative determination otherwise.

(Candidate Path Table 245)

FIG. 15 is a diagram illustrating an exemplary candidate path table 245. The candidate path table 245 stores information on different paths on respective rows, and each row includes a candidate path ID 901, a cumulative cost 902, a lane change difficulty flag 903, a lane change difficulty reason 904, a path length 905, an in-path link number 906, and an in-path link ID column 907.

The candidate path ID 901 is an identifier for identifying each of a plurality of candidate paths. The cumulative cost 902 is the link cost sum of the candidate path. A value with a penalty cost added is set for a candidate path determined to include an interval for which lane change is difficult as a result of execution of lane change difficulty determination processing. The lane change difficulty flag 903 indicates whether a candidate path includes an interval for which lane change is difficult, and for example, the flag is set to "1" when the candidate path includes the interval or is set to "0" when the candidate path does not include the interval.

The lane change difficulty reason 904 is the maximum cause for determination that lane change is difficult in a candidate path for which the lane change difficulty flag 903 is "1". For example, "bifurcation wait congestion" is stored when bifurcation wait congestion occurs and the distance available for lane change is short, "high traffic density" is stored when the traffic density is high and the distance necessary for lane change is long, and "automated driving use" is stored when the distance necessary for lane change is long because automated driving is to be used. The path length 905 is the sum of the lengths of links from the origin to the destination of the candidate path. The in-path link number 906 is the number of links included in the candidate path. The in-path link ID column 907 is a column of IDs identifying for the links included in the candidate path.

Although the candidate path table 245 is described above with reference to FIG. 15, the configuration of the candidate path table 245 is not limited thereto. For example, information specifying a mesh on which a link in a path exists, in other words, the unit of map data management may be included, and the direction and property information of each link may be added.

Figure 16:
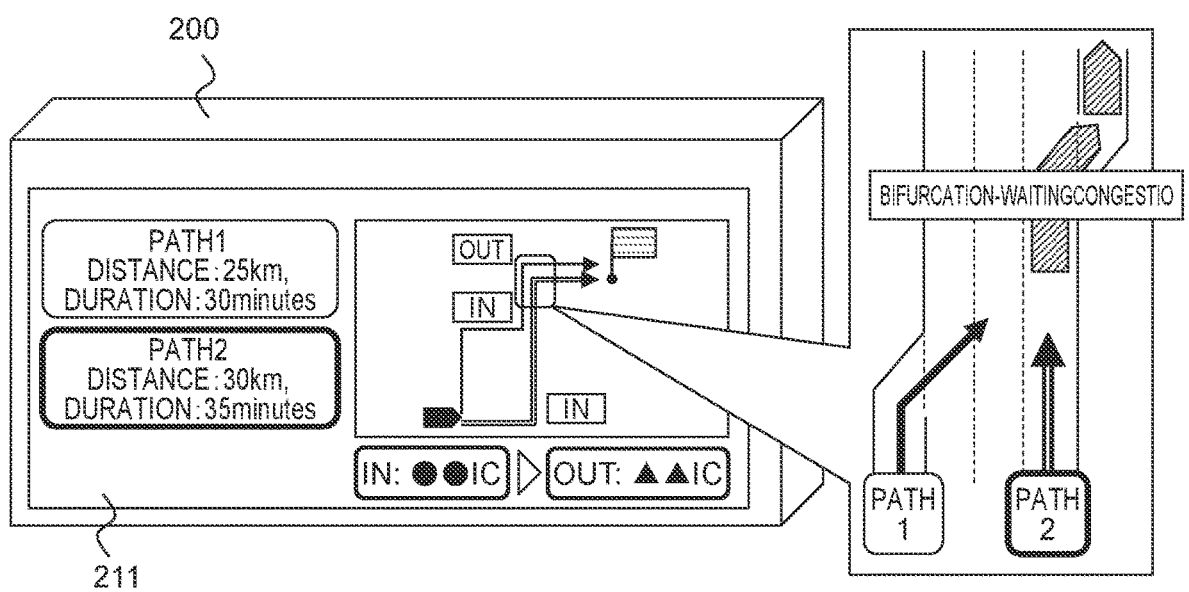
FIG. 16 is a diagram illustrating exemplary presentation of candidate paths to a user by the path search unit 232 through a display unit 211.

FIG. 16 is a diagram illustrating exemplary presentation of candidate paths to the user by the path search unit 232 through the display unit 211. A plurality of candidate paths are displayed on the display unit 211 on the left side in the drawing, and for example, a travel distance and a necessary duration are displayed for each candidate. When either candidate path is selected by the user, details of the candidate path are displayed on the right side in the drawing. The displayed details of the candidate path are, for example, information listed in the candidate path table 245, and when a link for which the necessary distance D1 is longer than the possible travel distance D2 is included, the contents of the lane change difficulty reason 904 of the candidate path table 245, in other words, a cause for the necessary distance D1 being longer than the possible travel distance D2 is included. When either candidate path is determined as a path to be traveled by the user, information on the determined path is transmitted from the path search unit 232 to the path guide unit 233.

According to the second embodiment described above, the following effects can be obtained.

(7) When a calculated path includes a lane movement link for which the necessary distance D1 is longer than the possible travel distance D2, the path search unit 232 outputs a cause for the necessary distance D1 being longer than the possible travel distance D2 to the user by using the output unit 210. In this manner, the path search unit 232 outputs, for a path for which lane change is determined to be difficult, a reason of the determination, and thus the user can be convinced when selecting one of a plurality of paths.

Modification of Second Embodiment

The second embodiment described above may be modified as described below.

(1) Details of a candidate path displayed on the display unit 211 may be displayed with the entire path on a map or may be displayed only with an interval for which lane change is difficult.

(2) The path search unit 232 may display, on the display unit 211, whether each candidate path includes an interval for which lane change is difficult.

(3) The path search unit 232 may display a candidate path on the display unit 211 only when the cumulative cost of the candidate path has a difference that satisfies a predetermined condition, for example, when the cost difference is less than 10% or the cost difference is less than 100.

(4) The voice output unit 212 may be used together. For example, a reason for lane change difficulty may be presented by voice for a candidate path, details of which are displayed on the display unit 211.

(5) Only the voice output unit 212 may be used without the display unit 211.

Third Embodiment

A third embodiment of a path search server according to the present invention will be described below with reference to FIG. 17. In the following description, a component the same as that of the first embodiment is denoted by the same reference sign, and difference therebetween will be mainly described. Features not particularly described are the same as those of the first embodiment. The present embodiment is different from the first embodiment mainly in that the path search server performs path search.

(System Configuration)

Figure 17:
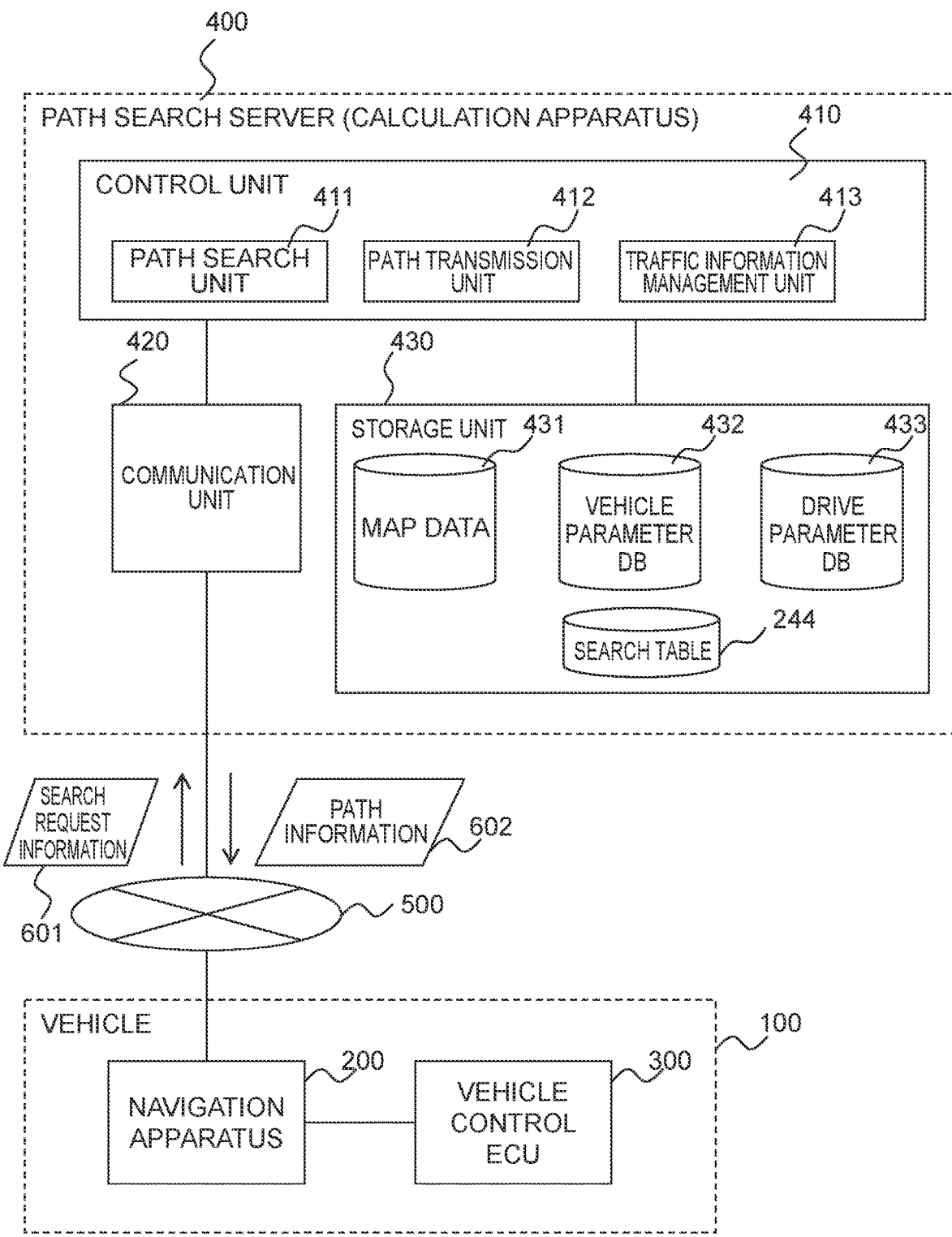
FIG. 17 is a configuration diagram of a path search system 1A in a third embodiment.

FIG. 17 is a configuration diagram of a path search system 1A in the third embodiment. This path search server 400 includes a control unit 410, a communication unit 420, and a storage unit 430. In the present embodiment, the path search server 400 is also referred to as a "calculation apparatus". The control unit 410 includes a CPU as a central calculation apparatus, a ROM as a read-only storage apparatus, and a RAM as a readable-writable storage apparatus, and the CPU loads a computer program stored in the ROM onto the RAM and executes the computer program, thereby achieving functions to be described later. The communication unit 420 is a communication module configured to communicate with the navigation apparatus 200 through a communication network 500. The communication network 500 may be the Internet, a closed network, or a combination of the Internet and a closed network. In the present embodiment, the navigation apparatus 200 includes a communication module compatible with the communication network 500, and the path search server 400 and the navigation apparatus 200 perform communication through the communication network 500.

The storage unit 430 is a non-transitory storage apparatus, for example, a hard disk drive. The storage unit 430 stores map data 431, a vehicle parameter 432, a driver parameter 433, and a search table 434. The map data 431, the vehicle parameter 432, the driver parameter 433, and the search table 434 correspond to the map data 241, the vehicle parameter 242, the driver parameter 243, and the search table 244, respectively, in the first embodiment. Parameters for each identifier of the navigation apparatus 200 are stored in the vehicle parameter DB 432 and the driver parameter 433 to support a plurality of navigation apparatuses 200.

The control unit 410 includes, as functions thereof, a path search unit 411, a path transmission unit 412, and a traffic information management unit 413. Operation of the path search unit 411, the path transmission unit 412, and the traffic information management unit 413 corresponds to the path search unit 232, the path transmission unit 234, and the traffic information management unit 235, respectively, of the navigation apparatus 200 in the first embodiment. The path search unit 411 receives a command from the navigation apparatus 200 and performs search. The path transmission unit 412 transmits a result of the search by the path search unit 411 to the navigation apparatus 200 through the communication network 500.

(Operation Overview)

When a destination is input by the user, the navigation apparatus 200 transmits search request information 601 to the path search server 400 through the communication network 500. The search request information 601 includes own-vehicle position and destination, search conditions, the identifier of the navigation apparatus and the like. Having received the search request information 601 at the communication unit 420, the path search server 400 performs path search by using the map data 431 and the like through the path search unit 411. Path calculation processing and lane change difficulty determination processing are the same as those of the first embodiment and thus description thereof is omitted. When selection of a guide path is completed, the path transmission unit 412 transmits path information 602 to the navigation apparatus 200. The path information 602 may have a data format the same as that of the candidate path table 245 illustrated in FIG. 15 or may have any other format as long as information necessary for path guide is included. The navigation apparatus 200 performs guide by using the received path information 602 as a guide path. When the driving mode is the automated driving mode, the navigation apparatus 200 transmits the path to the vehicle control ECU 300 for use in vehicle control.

According to the third embodiment described above, the following effects can be obtained.

(8) The path search server 400 as a calculation apparatus includes the communication unit 420 mounted on the vehicle 100 and configured to transmit an origin and a destination and communicate with the navigation apparatus 200 configured to receive a path calculated by the path search unit 411. Accordingly, path search is performed by the path search server 400 having a sufficient amount of calculation resources and capable of obtaining latest wide-range traffic information, and thus a more appropriate path can be calculated. In addition, a calculation load on the navigation apparatus 200 is reduced.

Modification of Third Embodiment

In the third embodiment described above, the path search server 400 includes the vehicle parameter DB 432 and the driver parameter DB 433. However, the path search server 400 may not include these components, and the navigation apparatus 200 may transmit the vehicle parameter 242 and the driver parameter 243, which are used in calculation of the distance necessary for lane change, to the path search server 400 together with an origin and a destination.

In the above-described embodiments and modifications, a computer program is stored in a ROM (not illustrated), but the computer program may be stored in the storage unit 240. The navigation apparatus 200 may include an input-output interface (not illustrated), and a computer program may be read from another apparatus through a medium compatible with the input-output interface and the navigation apparatus 200 when needed. The medium is, for example, a storage medium detachably attached to the input-output interface, or a communication medium, in other words, for example, a wired, wireless, or optical network, or carrier waves or digital signals propagating through the network. Some or all functions achieved by the computer program may be achieved by a hardware circuit or a FPGA.

The above-described embodiments and modifications may be combined with each other. Although various kinds of embodiments and modifications are described above, the present invention is not limited to these contents. Any other form that would be thought within the range of technical idea of the present invention is included in the range of the present invention.

The entire contents of the following priority claim application are incorporated herein by reference.

Japanese Patent Application No. 2018-114809 (filed on Jun. 15, 2018)

REFERENCE SIGNS LIST

1 . . . path search system
100 . . . vehicle
200 . . . navigation apparatus
210 . . . output unit
230 . . . control unit
232 . . . path search unit
234 . . . path transmission unit
240 . . . storage unit
241 . . . map data
242 . . . vehicle parameter
243 . . . driver parameter
244 . . . search table
245 . . . candidate path table
350 . . . switch
400 . . . path search server
410 . . . control unit
411 . . . path search unit
412 . . . path transmission unit
413 . . . traffic information management unit
420 . . . communication unit
430 . . . storage unit
431 . . . map data
432 . . . vehicle parameter
433 . . . driver parameter
434 . . . search table
601 . . . search request information 602 . . . path information
701 . . . other-vehicle

The invention claimed is:

1. A navigation system for guiding a vehicle to make a lane change comprising:
 a control unit including a processor and memory, the processor configured to calculate a safe distance for the vehicle to perform lane change from a first travel lane to a second travel lane by adding
 a first distance that the vehicle travels in the first travel lane while the vehicle waits to start the lane change, wherein the first distance increases as traffic density in the second travel lane increases,
 a second distance that the vehicle travels before a speed of the vehicle is adjusted to traffic speed in the second travel lane, and
 a third distance that the vehicle travels while executing the lane change, wherein the third distance is calculated by the processor as a function of lateral-direction acceleration rate of the vehicle while executing the lane change.

2. The navigation system according to claim 1, wherein the processor
 calculates a path from an origin to a destination,
 calculates the safe distance for a lane movement link for which lane change is necessary,
 calculates a possible travel distance that the vehicle can travel in the lane movement link for lane change, and
 calculates a path that is unlikely to pass through the lane movement link when the safe distance is longer than the possible travel distance.

3. The navigation system according to claim 1, wherein the processor considers traffic density at the second travel lane in calculation of the first distance.

4. The navigation system according to claim 1, wherein the processor uses a parameter different for each driver or automated driving system of the vehicle in calculation of the second distance.

5. The navigation system according to claim 1, wherein the processor uses a parameter different for each driver or automated driving system control executor of the vehicle in calculation of the third distance.

6. The navigation system according to claim 2, wherein the processor considers a length of congestion at the second travel lane in calculation of the possible travel distance.

7. The navigation system according to claim 2, wherein, when the calculated path includes the lane movement link for which the safe distance is longer than the possible travel distance, the processor outputs a cause for the safe distance being longer than the possible travel distance to a user.

8. The navigation system according to claim 2, further comprising a communication unit mounted on the vehicle and configured to transmit the origin and the destination and communicate with a navigation apparatus configured to receive the path calculated by the processor.

9. A method, executed by a computer, for guiding a vehicle to make a lane change, the method comprising:
 calculating a safe distance for the vehicle to perform lane change from a first travel lane to a second travel lane, the calculation method calculating the safe distance by adding
 a first distance that the vehicle travels in the first travel lane while the vehicle waits to start the lane change, wherein the first distance increases as traffic density in the second travel lane increases,
 a second distance that the vehicle travels before a speed of the vehicle is adjusted to traffic speed in the second travel lane, and
 a third distance that the vehicle travels while executing the lane change, wherein the third distance is calculated by the processor as a function of lateral-direction acceleration rate of the vehicle while executing the lane change.

10. The method according to claim 9, comprising:
calculating a path from an origin to a destination;
calculating the safe distance for a lane movement link for which lane change is necessary;
calculating a possible travel distance that the vehicle can travel in the lane movement link for lane change; and
calculating a path that is unlikely to pass through the lane movement link when the safe distance is longer than the possible travel distance.

11. The method according to claim 10, further comprising
receiving the origin and the destination from a navigation apparatus, and
transmitting the calculated path to the navigation apparatus.

* * * * *